(12) United States Patent
Pinto et al.

(10) Patent No.: US 12,360,802 B2
(45) Date of Patent: Jul. 15, 2025

(54) SYSTEMS AND METHOD FOR BATCHING REQUESTS IN COMPUTATIONAL DEVICES

(71) Applicant: Samsung Electronics Co., Ltd., Suwon-si (KR)

(72) Inventors: Oscar P. Pinto, San Jose, CA (US); Matthew Bryson, Los Gatos, CA (US); Vishwanath Maram, San Jose, CA (US); Son T. Pham, San Ramon, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 538 days.

(21) Appl. No.: 17/359,495

(22) Filed: Jun. 25, 2021

(65) Prior Publication Data

US 2022/0066821 A1 Mar. 3, 2022

Related U.S. Application Data

(60) Provisional application No. 63/144,469, filed on Feb. 1, 2021, provisional application No. 63/142,485, filed on Jan. 27, 2021, provisional application No. 63/141,970, filed on Jan. 26, 2021, provisional application No. 63/073,922, filed on Sep. 2, 2020.

(51) Int. Cl.
*G06F 9/48* (2006.01)

(52) U.S. Cl.
CPC ...... *G06F 9/4881* (2013.01); *G06F 2209/482* (2013.01)

(58) Field of Classification Search
CPC . G06F 9/46; G06F 9/466; G06F 9/467; G06F 9/4806; G06F 9/4837; G06F 9/4843; G06F 9/4881
See application file for complete search history.

(56) References Cited

U.S. PATENT DOCUMENTS

| 5,805,777 | A | 9/1998 | Kuchta |
| 6,976,255 | B1 | 12/2005 | Clark et al. |
| 7,315,807 | B1 | 1/2008 | Lavallee et al. |
| 7,433,931 | B2 | 10/2008 | Richoux |
| 7,801,931 | B2 | 9/2010 | Tunar et al. |

(Continued)

FOREIGN PATENT DOCUMENTS

| CN | 102929813 B | 6/2016 |
| CN | 109254873 A | 1/2019 |

(Continued)

OTHER PUBLICATIONS

Office Action for U.S. Appl. No. 17/234,780, mailed Jan. 5, 2023.

(Continued)

*Primary Examiner* — Andy Ho
(74) *Attorney, Agent, or Firm* — Renaissance IP Law Group LLP

(57) ABSTRACT

A system is described. The system may include a processor. Software may run on the processor to build a batch request, which may include at least a first request and a second request. The system may also include a storage device and a computational storage unit associated with the storage device, which may be configured to execute the batch request.

21 Claims, 24 Drawing Sheets

(56) References Cited

U.S. PATENT DOCUMENTS

| | | | |
|---|---|---|---|
| 7,937,703 B2* | 5/2011 | Bethea | H04L 67/566 |
| | | | 709/248 |
| 8,381,004 B2 | 2/2013 | Elnozahy et al. | |
| 8,615,570 B2 | 12/2013 | Brewis et al. | |
| 8,726,299 B1 | 5/2014 | Bromley et al. | |
| 8,904,072 B2 | 12/2014 | Lee | |
| 8,943,504 B2* | 1/2015 | Vijayarajan | G06F 9/466 |
| | | | 710/200 |
| 9,203,627 B2 | 12/2015 | Edstrom et al. | |
| 9,398,016 B1 | 7/2016 | Chakraborty et al. | |
| 9,406,082 B2 | 8/2016 | Smedberg et al. | |
| 9,596,135 B1 | 3/2017 | Thomas et al. | |
| 9,626,120 B1 | 4/2017 | Jia et al. | |
| 10,162,793 B1 | 12/2018 | Bshara et al. | |
| 10,303,382 B1 | 5/2019 | Chu et al. | |
| 10,359,953 B2 | 7/2019 | Cargnini et al. | |
| 10,394,746 B2 | 8/2019 | Kachare et al. | |
| 10,404,811 B2* | 9/2019 | Ly | H04L 67/51 |
| 10,412,187 B2 | 9/2019 | Busayarat et al. | |
| 10,476,936 B1 | 11/2019 | Retnakumari et al. | |
| 10,521,114 B2 | 12/2019 | Thomas | |
| 10,621,114 B1 | 4/2020 | Bshara et al. | |
| 10,637,962 B2 | 4/2020 | Gay et al. | |
| 10,771,340 B2 | 9/2020 | Ballapuram | |
| 10,795,726 B2* | 10/2020 | Fujii | G06F 9/46 |
| 10,802,753 B2 | 10/2020 | Kabra et al. | |
| 10,838,905 B2 | 11/2020 | Zou et al. | |
| 10,846,096 B1 | 11/2020 | Chung et al. | |
| 10,860,511 B1 | 12/2020 | Thompson et al. | |
| 10,877,750 B1 | 12/2020 | Connolly et al. | |
| 11,294,576 B2 | 4/2022 | Khan et al. | |
| 11,334,382 B2* | 5/2022 | Bernat | G06F 16/2365 |
| 11,474,974 B2* | 10/2022 | Lutz | G06F 16/1734 |
| 11,507,298 B2 | 11/2022 | Yang et al. | |
| 11,630,921 B2* | 4/2023 | Sinha | G06F 13/4063 |
| | | | 726/26 |
| 11,687,498 B2 | 6/2023 | Trika et al. | |
| 2003/0093572 A1 | 5/2003 | Laux et al. | |
| 2004/0220918 A1* | 11/2004 | Scriffignano | G06F 16/2468 |
| 2005/0132341 A1 | 6/2005 | Lanzatella et al. | |
| 2007/0276924 A1 | 11/2007 | Newton et al. | |
| 2008/0004887 A1 | 1/2008 | Brunswig et al. | |
| 2008/0279161 A1 | 11/2008 | Stirbu et al. | |
| 2011/0066676 A1* | 3/2011 | Kleyzit | H04L 67/289 |
| | | | 709/203 |
| 2011/0185295 A1 | 7/2011 | Kashida | |
| 2012/0079172 A1 | 3/2012 | Yoshida | |
| 2012/0152576 A1 | 6/2012 | Bassinger et al. | |
| 2012/0162234 A1 | 6/2012 | Blinzer et al. | |
| 2013/0173662 A1* | 7/2013 | Kaplinger | G06F 16/24542 |
| | | | 707/774 |
| 2014/0143778 A1 | 5/2014 | Gopal et al. | |
| 2014/0310332 A1 | 10/2014 | Huang et al. | |
| 2015/0319246 A1 | 11/2015 | Ishizaka | |
| 2016/0012128 A1 | 1/2016 | Siebler et al. | |
| 2016/0054931 A1 | 2/2016 | Romanovsky et al. | |
| 2016/0328344 A1 | 11/2016 | Jose et al. | |
| 2017/0249088 A1 | 8/2017 | Thomas | |
| 2018/0063145 A1 | 3/2018 | Cayton et al. | |
| 2018/0352038 A1 | 12/2018 | Sathyanarayana et al. | |
| 2019/0037280 A1 | 1/2019 | Yang et al. | |
| 2019/0349281 A1 | 11/2019 | Oztaskent et al. | |
| 2020/0012439 A1 | 1/2020 | Khan et al. | |
| 2020/0050480 A1 | 2/2020 | Cao et al. | |
| 2020/0057578 A1 | 2/2020 | Benisty et al. | |
| 2020/0081640 A1 | 3/2020 | Enz et al. | |
| 2020/0117517 A1 | 4/2020 | Costa et al. | |
| 2020/0167098 A1 | 5/2020 | Shah et al. | |
| 2020/0183582 A1 | 6/2020 | Kachare et al. | |
| 2020/0192592 A1 | 6/2020 | Song et al. | |
| 2020/0201575 A1 | 6/2020 | Mizrahi | |
| 2020/0301898 A1 | 9/2020 | Samynathan et al. | |
| 2020/0310694 A1 | 10/2020 | Gao et al. | |
| 2020/0379781 A1 | 12/2020 | Rachapudi et al. | |
| 2021/0026560 A1 | 1/2021 | Pillai et al. | |
| 2021/0247922 A1 | 8/2021 | Song et al. | |
| 2021/0303159 A1 | 9/2021 | Ke | |
| 2021/0377117 A1 | 12/2021 | Kanevsky et al. | |
| 2022/0058137 A1 | 2/2022 | Xu et al. | |
| 2022/0188028 A1 | 6/2022 | Mesnier et al. | |
| 2022/0236911 A1 | 7/2022 | Jones | |
| 2022/0295255 A1 | 9/2022 | Karampatsis et al. | |
| 2023/0244499 A1 | 8/2023 | Gupta et al. | |

FOREIGN PATENT DOCUMENTS

| | | |
|---|---|---|
| EP | 3964956 A1 | 3/2022 |
| KR | 20120071060 A | 7/2012 |
| KR | 20140001970 A1 | 1/2014 |
| KR | 20170121661 A | 11/2017 |
| KR | 20180106822 A | 10/2018 |
| KR | 20200068564 A | 6/2020 |
| TW | 200622673 A | 7/2006 |
| TW | 201214288 A | 4/2012 |
| TW | 201324352 A | 6/2013 |
| TW | 202102976 A | 1/2021 |
| WO | 2002097610 A1 | 12/2002 |

OTHER PUBLICATIONS

Anandan, Sabby et al., "Industry Paper: Spring XD—A Modular Distributed Stream and Batch Processing System," DEBS '15: Proceedings of the 9th ACM International Conference on Distributed Event-Based Systems, Jun. 2015, pp. 217-225.

Carbone, Paris et al., "Apache Flink™: Stream and Batch Processing in a Single Engine," Bulletin of the IEEE Computer Society Technical Committee on Data Engineering, vol. 36, No. 4, 2015, pp. 28-38.

European Extended Search Report for Application No. 21190626.8, mailed Jan. 28, 2022.

European Extended Search Report for Application No. 21212137.0, mailed Apr. 28, 2022.

Fisher, Mark et al., "Spring XD Guide", 1.3.3.BUILD-SNAPSHOT, 2013, 400 pages.

NVM Express, Inc., "NVM Express TM over Fabrics Revision 1.1," Oct. 22, 2019, pp. 1-83, XP055877791, Retrieved from the Internet: URL:https://nvmexpress.org/wp-content/uploads/NVMe-over-Fabrics-1.1-2019.10.22-Ratified.pdf, retrieved on Jan. 11, 2022.

Office Action for U.S. Appl. No. 17/495,810, mailed Oct. 17, 2022.

Torabzadehkashi, Mahdi, et al. "Computational Storage: An Efficient and Scalable Platform for Big Data and HPC Applications," Journal of Big Data, vol. 6, No. 1, 2019, pp. 1-29.

Final Office Action for U.S. Appl. No. 17/495,810, mailed Apr. 14, 2023.

Final Office Action for U.S. Appl. No. 17/234,780, mailed Aug. 17, 2023.

Office Action for U.S. Appl. No. 17/234,780, mailed Dec. 22, 2023.

Office Action for U.S. Appl. No. 17/495,810, mailed Oct. 5, 2023.

Office Action for U.S. Appl. No. 17/502,023, mailed Oct. 5, 2023.

Bates, Stephen, "Accelerating RocksDB with Eideticom's NoLoad NVMe-based Computational Storage Processor," Storage Developer Conference 2019, Sep. 2019, retrieved from the Internet: URL:https://www.snia.org/sites/defaultifiles/SDC/2019/presentations/Computational/Bates_Stephen_Accelerating_RocksDB_with_Eideticom's_NoLoad_NVMe-based_ComputationalStorage_Processor.pdf [retrieved on Feb. 8, 2024], 16 pages.

Chambers, Bill et al., "Spark, The Definitive Guide: Big Data Processing Made Simple", first 400 pages, Feb. 2018, retrieved from the Internet: URL:https://analyticsdata24.files.wordpress.com/2020/02/spark-the-definitive-guide40www.bigdatabugs.com_.pdf [retrieved on Jan. 18, 2024], 400 pages.

European Summons to Oral Proceedings for Application No. 21190626.8, mailed Feb. 15, 2024.

European Summons to Oral Proceedings for Application No. 21190952.8, mailed Jan. 25, 2024.

Gounaris, Anastasios et al., "Dynamic Configuration of Partitioning in Spark Applications," IEEE Transactions on Parallel and Distributed Systems, vol. 28, No. 7, Jul. 2017, [retrieved on Jun. 10, 2017], pp. 1891-1904.

(56) References Cited

OTHER PUBLICATIONS

Molgaard, Jason, "A Simple Approach to Implementing Computational Storage," Storage Developer Conference 2019, Sep. 2019, retrieved from the Internet: URL:https://www.snia.org/sites/defaultifiles/SDC/2019/presentations/Computational/Molgaard_Jason_A_Simple_Approach_to_Implementing_Computational_Storage.pdf [retrieved on Feb. 8, 2024], 25 pages.

Prasaad, Guna et al., "Improving High Contention OLTP Performance via Transaction Scheduling", arXiv.org, Oct. 2018, retrieved from the Internet: URL:https://arxiv.org/pdf/1810.01997.pdf [retrieved on Jan. 17, 2024], 15 pages.

Sabiu, Habib Ado, "Performance Evaluation of Job Scheduling and Resource Allocation in Apache Spark," Jul. 2018, retrieved from the Internet: URL:https://harvest.usask.ca/server/api/core/bitstreams/9654d97a-5217-486d-b8ae-df305acfc5b8/content [retrieved on Jan. 17, 2024], 104 pages.

Shadley, Scott et al., "What Happens When Compute Meets Storage? ," Sep. 2019, retrieved from the Internet: URL:https://www.snia.org/sites/defaultifiles/SDC/2019/presentations/Computational/Shadley_Scott_Adams_Nick_What_Happens_when_Compute_meets_Storage_Computational_Storage_TWG.pdf [retrieved on Jan. 13, 2022], 28 pages.

SNIAVIDEO: "What Happens when Compute Meets Storage (SDC 2019)," Oct. 2019, retrieved from the Internet: URL:https://www.youtube.com/watch?=45nhck3tN4U [retrieved on Feb. 8, 2024], 2 pages.

Tang, Shanjiang et al., "A Survey on Spark Ecosystem for Big Data Processing," arxiv.org, Nov. 2018, 21 pages.

Wikipedia, "Message Broker," Jul. 2020, retrieved from the Internet: URL:https://en.wikipedia.org/w/index.php?title=Message_broker&0ldid=966520924 [retrieved on Jan. 18, 2024], 3 pages.

European Office Action for Application No. 21190952.8, mailed Oct. 18, 2024.

European Office Action for Application No. 21212137.0, mailed Oct. 25, 2024.

Li, Yonghui et al., "Architecture and Analysis of a Dynamically-Scheduled Real-Time Memory Controller," Real-Time Systems, Jul. 2015, vol. 52, pp. 675-729.

Li, Yonghui, "Design and Formal Analysis of Real-Time Memory Controllers," Phd Thesis 1 (Research TU/e /Graduation TU/e), Electrical Engineering, Sep. 2016, 207 pages.

Mutlu, Onur et al., "Parallelism-Aware Batch Scheduling: Enhancing both Performance and Fairness of Shared DRAM Systems," International Symposium on Computer Architecture, ACM SIGARCH Computer Architecture News, 2008, vol. 36, Issue 3, pp. 63-74.

Prieto, Pablo et al., "CMP Off-Chip Bandwidth Scheduling Guided by Instruction Criticality," ICS '13: Proceedings of the 27th International ACM Conference on International Conference on Supercomputing, Jun. 2013, pp. 379-388.

Zhou, Ping et al., "Throughput Enhancement for Phase Change Memories," IEEE Transactions on Computers, vol. 63, No. 8, Aug. 2014, pp. 2080-2093.

Corrected Notice of Allowability for U.S. Appl. No. 17/495,810, mailed Dec. 11, 2024.

Corrected Notice of Allowability for U.S. Appl. No. 17/495,810, mailed Oct. 25, 2024.

Corrected Notice of Allowability for U.S. Appl. No. 17/495,810, mailed Oct. 7, 2024.

Notice of Allowance for U.S. Appl. No. 17/502,023, mailed Nov. 26, 2024.

Office Action for U.S. Appl. No. 17/234,780, mailed Dec. 19, 2024.

Warke, Amit, et al. "Storage Service Orchestration with Container Elasticity," 2018 IEEE 4th International Conference on Collaboration and Internet Computing (CIC), IEEE, 2018, pp. 283-292.

Notice of Allowability for U.S. Appl. No. 17/502,023, mailed Feb. 4, 2025.

Final Office Action for U.S. Appl. No. 17/495,810, mailed May 20, 2024.

Final Office Action for U.S. Appl. No. 17/234,780, mailed Jul. 5, 2024.

Final Office Action for U.S. Appl. No. 17/502,023, mailed Jun. 20, 2024.

Notice of Allowance for U.S. Appl. No. 17/495,810, mailed Aug. 22, 2024.

Castellani, Angelo P. et al., "WebIoT: A Web Application Framework for the Internet of Things," WCNC 2012 Workshop on Internet of Things Enabling Technologies, Embracing Machine-to-Machine Communications and Beyond, 2012, pp. 202-207.

European Office Action for Application No. 22174076.4, mailed Jul. 8, 2024.

Kerdoudi, Mohamed Lamine et al., "Recovering Software Architecture Product Lines," 2019 24th International Conference on Engineering of Complex Computer Systems (ICECCS), 2019, pp. 226-235.

Notice of Allowance for U.S. Appl. No. 17/234,780, mailed Apr. 15, 2025.

European Summons to Oral Proceedings for Application No. 21190952.8, mailed Mar. 26, 2025.

Notice of Allowance for U.S. Appl. No. 17/502,023, mailed May 23, 2025.

\* cited by examiner

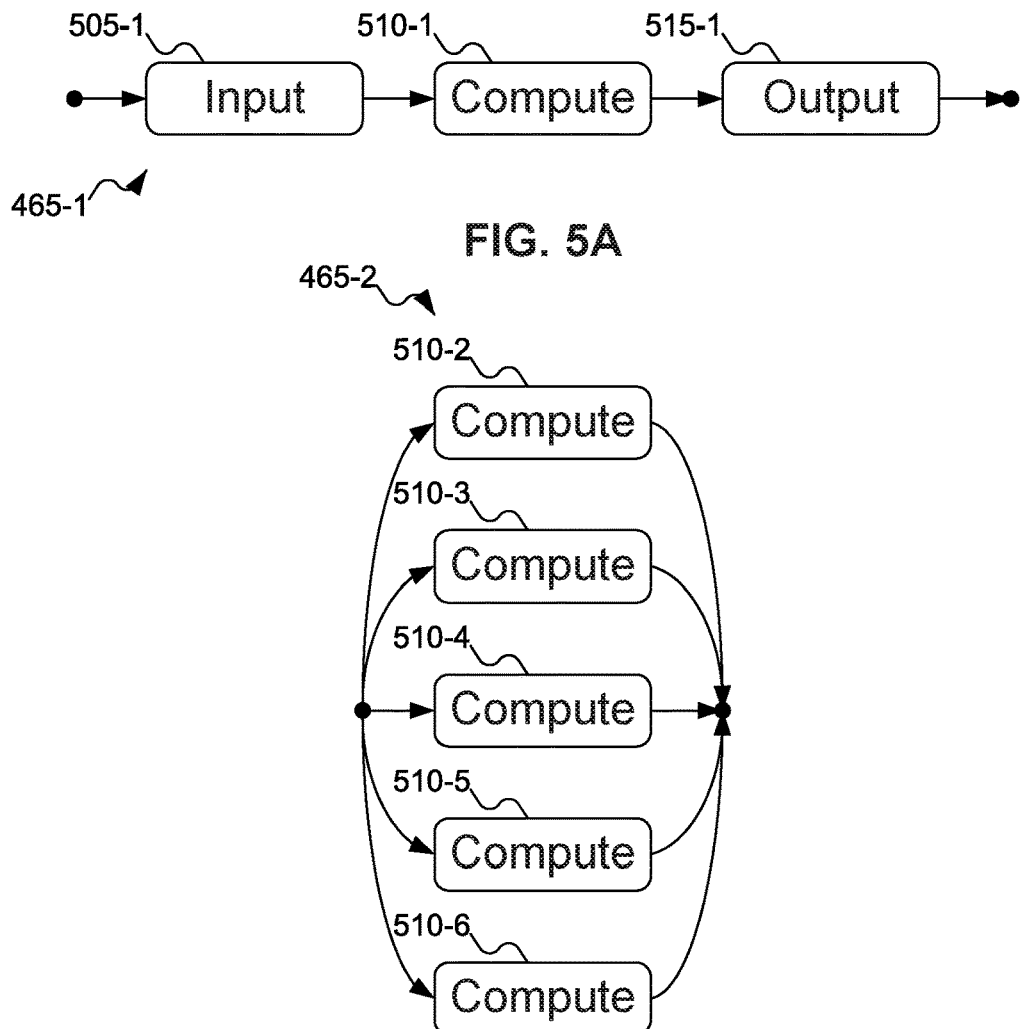
FIG. 5A
FIG. 5B
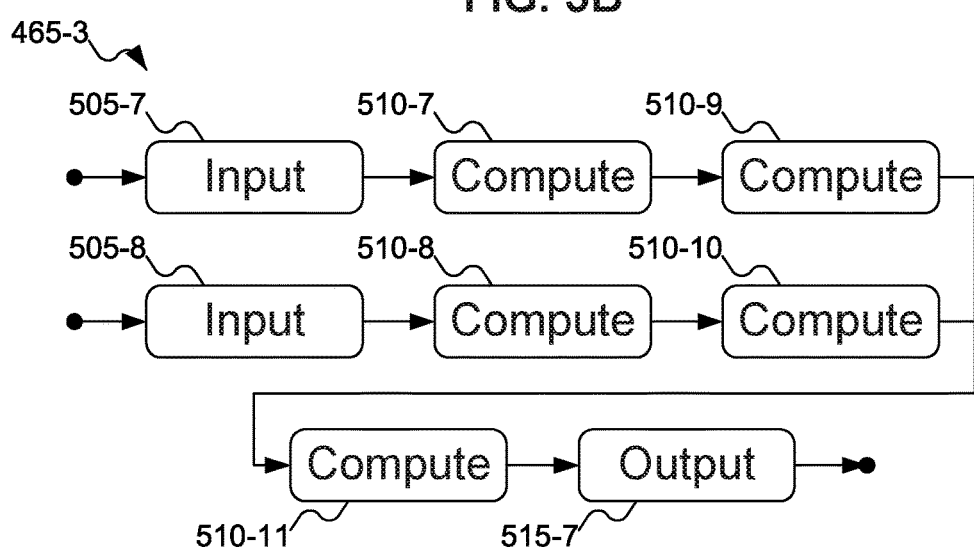
FIG. 5C

905

```
typedef struct {
    enum CS_BATCH_REQ_TYPE reqType;
    u32 reqLength;
    union {
        CsCopyMemRequest CopyMem;
        CsStorageRequest StorageIo;
        CsComputeRequest Compute;
    } u;
} CsBatchRequest;
```

910

```
typedef struct {
    CS_BATCH_MODE Mode;
    struct CsBatchRequest *Next;
    struct CsBatchDependency *Dep;
    s32 NumReqs;
    CsBatchArg Reqs[1];
} CsBatchRequest;
```

915

```
typedef struct {
    CS_BATCH_MODE Mode;
    char Reserved[16];
    s32 NumReqs;
    CsBatchArg Reqs[1];
} CsBatchRequest;
```

FIG. 9

```
 1  status = csAllocBatchRequest(CS_BATCH_SERIAL, 3, &BatchHandle);

2  storEntry = csAddBatchEntry(BatchHandle, &storReq, 0, 0);
 3  compEntry = csAddBatchEntry(BatchHandle, &compReq, 0, storEntry);
 4  copyEntry = csAddBatchEntry(BatchHandle, ©Req, 0, compEntry);

5  while (fileSize) {
 6      status = csQueueBatchRequest(BatchHandle, &myContext, NULL, NULL);
 7      fileSize -= dataSize;
 8      storReq.u.StorageIo.u.FileIo.Offset += dataSize;
 9      status = csHelperConfigBatchEntry(BatchHandle, storEntry, &storReq);
    }
10  status = csFreeBatchRequest(BatchHandle);
```

SYSTEMS AND METHOD FOR BATCHING REQUESTS IN COMPUTATIONAL DEVICES

RELATED APPLICATION DATA

This application claims the benefit of U.S. Provisional Patent Application Ser. No. 63/073,922, filed Sep. 2, 2020, U.S. Provisional Patent Application Ser. No. 63/141,970, filed Jan. 26, 2021, U.S. Provisional Patent Application Ser. No. 63/142,485, filed Jan. 27, 2021, and U.S. Provisional Patent Application Ser. No. 63/144,469, filed Feb. 1, 2021, all of which are incorporated by reference herein for all purposes.

This application is related to U.S. patent application Ser. No. 17/234,780, filed Apr. 19, 2021, which claims the benefit of U.S. Provisional Patent Application Ser. No. 63/073,922, filed Sep. 2, 2020, and U.S. Provisional Patent Application Ser. No. 63/144,469, filed Feb. 1, 2021, all of which are incorporated by reference herein for all purposes.

FIELD

The disclosure relates generally to storage devices, and more particularly to batch requests to use computational storage functions.

BACKGROUND

When a host processor sends a request to a storage device—whether to read data, write data, or for some near-storage processor to process data—the request typically involves three steps. First, the command (and possibly some data) is sent to the storage device. Second, the storage device executes the request. Third, the storage device sends a result (and possibly some data) back to the host processor.

A need remains to improve the handling of data near the storage device when near-storage processing is used.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 5A shows one structure for batch requests of FIG. 4B, according to embodiments of the disclosure.

FIG. 5B shows a second structure for batch requests of FIG. 4B, according to embodiments of the disclosure.

FIG. 5C shows a third structure for batch requests of FIG. 4B, according to embodiments of the disclosure.

FIG. 9 shows various example data structures that may be used to store the batch request of FIG. 4B, according to embodiments of the disclosure.

FIG. 10 shows an example snippet of code that may use the batch request of FIG. 4B, according to embodiments of the disclosure.

SUMMARY

Figure 1:
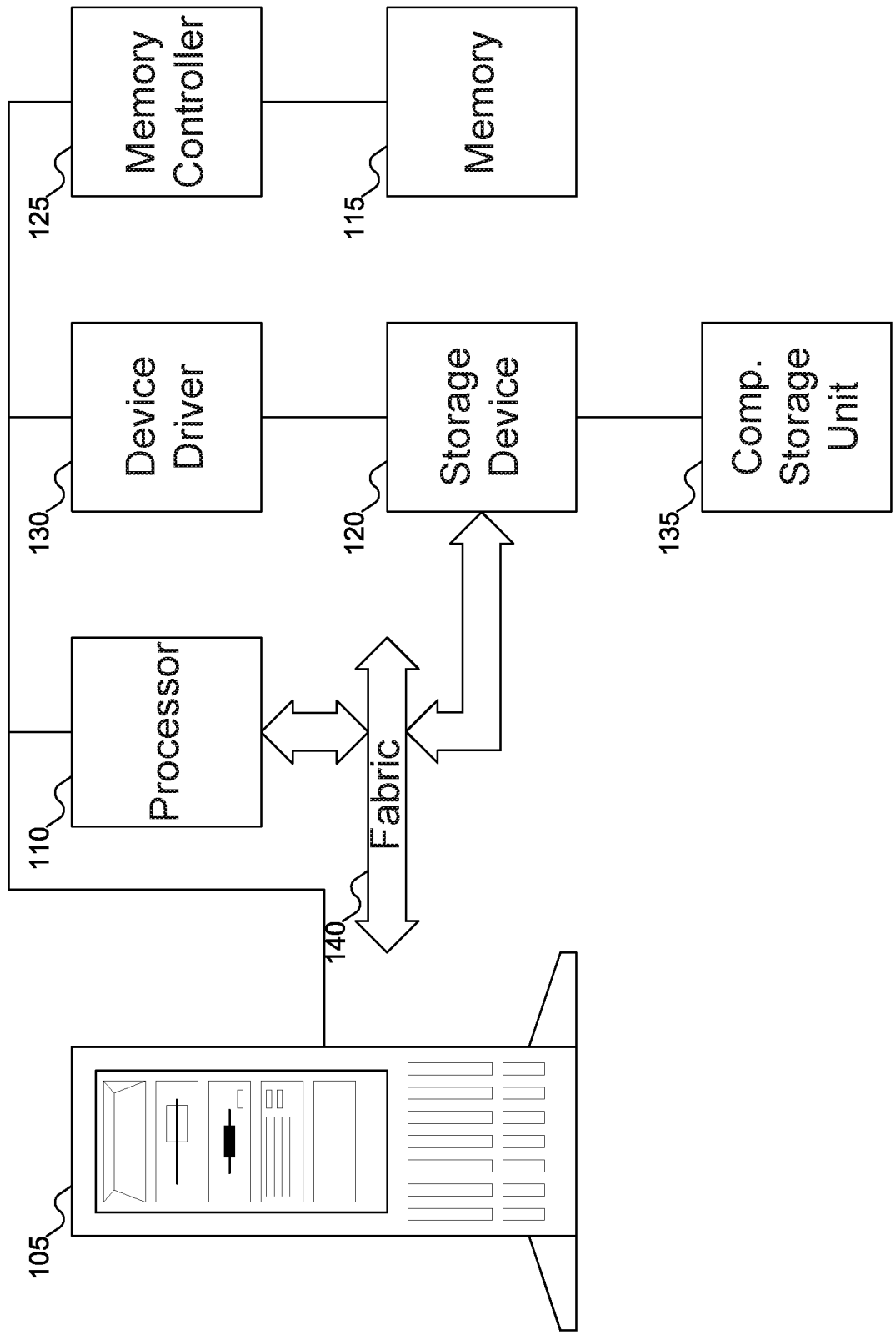
FIG. 1 shows a system including a computational storage unit that supports batch requests, according to embodiments of the disclosure.

Embodiments of the disclosure include a mechanism to build a batch request that may be used by an application. The batch request may include two or more requests. The application may send the batch request to a computational storage unit, which may execute the multiple requests in the batch request and return a result to the application. In this manner, the application may send one batch request that includes two or more individual requests and the computational storage unit may respond to the one batch request, rather than the application sending multiple individual requests to which the computational storage unit may send individual responses.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

When the host processor asks the storage device to carry out a single request, the load on the fabric may be acceptable. But if the host processor may want several requests to be carried out in some sequence, this load may become a bottleneck. For example, consider the situation where the host processor needs to read some data from the storage device, perform some processing on that data, and then write the processed data back to the storage device. As this sequence involves three separate requests, the fabric between the host processor and the storage device may carry information or data six times: once to send each request and any supporting data, and once to return each result.

Not only might the fabric become a bottleneck, but the fabric might be used to transmit large amounts of data back and forth. Continuing the above example, if the read request involves reading, say 5 GB of data from the storage device, then the fabric would carry 5 GB of data from the storage device to the host processor after the read request, only to carry that same 5 GB of data back to the storage device to perform the near-storage processing. Similarly, after the near-storage processing, the fabric would carry the processed data from the storage device to the host processor, only to carry that same processed data back to the storage device to write the data. Thus, the fabric may end up carrying data that did not need to be sent across the fabric.

Embodiments of the disclosure solve the problem of fabric burden by enabling an application to build a batch request. This batch request may include any number of processing requests, including reading data from or writing data to a storage device, transferring data between host memory and a storage device, and local processing requests. Once the batch request is assembled, the storage device may parse the batch request. The storage device may build a directed graph representing the dependencies of each individual request in the batch request, and may then execute individual requests in an appropriate order based on their dependencies. As a result, a batch request may represent a set of requests to be executed serially, in parallel, or in some combination (called a hybrid batch request).

The individual requests in a match request may be related. For example, the individual requests may be related in terms of using similar computational devices, similar network, similar storage resource requirements, or similar bandwidth requirements. In addition, the individual requests may be related in terms of resource management. For example, two requests may be related in using different (non-competing) computational device resources to enhance execution efficiency.

In some embodiments of the disclosure, by using an Application Programing Interface (API), the application may ignore code and instructions that detail how the storage device may execute the individual requests in the batch request. The application may also be agnostic to the processing capabilities of the storage device. If the storage device lacks the appropriate hardware and/or software to execute a particular request, the storage device may issue requests to other near-storage processing elements or the host processor to execute such requests.

FIG. 1 shows a system including a computational storage unit that supports batch requests, according to embodiments of the disclosure. In FIG. 1, machine 105, which may also be termed a host, may include processor 110, memory 115, and storage device 120. Processor 110 may be any variety of processor. (Processor 110, along with the other components discussed below, are shown outside the machine for case of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130.

Storage device 120 may be associated with computational storage unit 135. As discussed below with reference to FIGS. 3A-3D, computational storage unit 135 may be part of storage device 120 or it may be separate from storage device 120. The phrase "associated with" is intended to cover both a storage device that includes a computational storage unit and a storage device that is paired with a computational storage unit that is not part of the storage device itself. In other words, a storage device and a computational storage unit may be said to be "paired" when they are physically separate devices but are connected in a manner that enables them to communicate with each other.

In addition, the connection between the storage device and the paired computational storage unit might enable the two devices to communicate, but might not enable one (or both) devices to work with a different partner: that is, the storage device might not be able to communicate with another computational storage unit, and/or the computational storage unit might not be able to communicate with another storage device. For example, the storage device and the paired computational storage unit might be connected serially (in either order) to the fabric, enabling the computational storage unit to access information from the storage device in a manner another computational storage unit might not be able to achieve.

Processor 105 and storage device 120 are shown as connecting to fabric 140. Fabric 140 is intended to represent any fabric along which information may be passed. Fabric 140 may include fabrics that may be internal to machine 105, and which may use interfaces such as Peripheral Component Interconnect Express (PCIe), Serial AT Attachment (SATA), Small Computer Systems Interface (SCSI), among others. Fabric 140 may also include fabrics that may be external to machine 105, and which may use interfaces such as Ethernet, Infiniband, or Fibre Channel, among others. In addition, fabric 140 may support one or more protocols, such as Non-Volatile Memory (NVM) Express (NVMe), NVMe over Fabrics (NVMe-oF), or Simple Service Discovery Protocol (SSDP), among others. Thus, fabric 140 may be thought of as encompassing both internal and external networking connections, over which commands may be sent, either directly or indirectly, to storage device 120 (and more particularly, the computational storage unit associated with storage device 120).

While FIG. 1 uses the generic term "storage device", embodiments of the disclosure may include any storage device formats that may benefit from the use of data quality metrics, examples of which may include hard disk drives and Solid State Drives (SSDs). Any reference to "SSD" below should be understood to include such other embodiments of the disclosure. In addition, while the discussion above (and below) focuses on storage device 120 as being associated with a computational storage unit, embodiments of the disclosure may extend to devices other than storage devices that may include or be associated with a computational storage unit. Any reference to "storage device" above (and below) may be understood as also encompassing other devices that might be associated with a computational storage unit.

Figure 2:
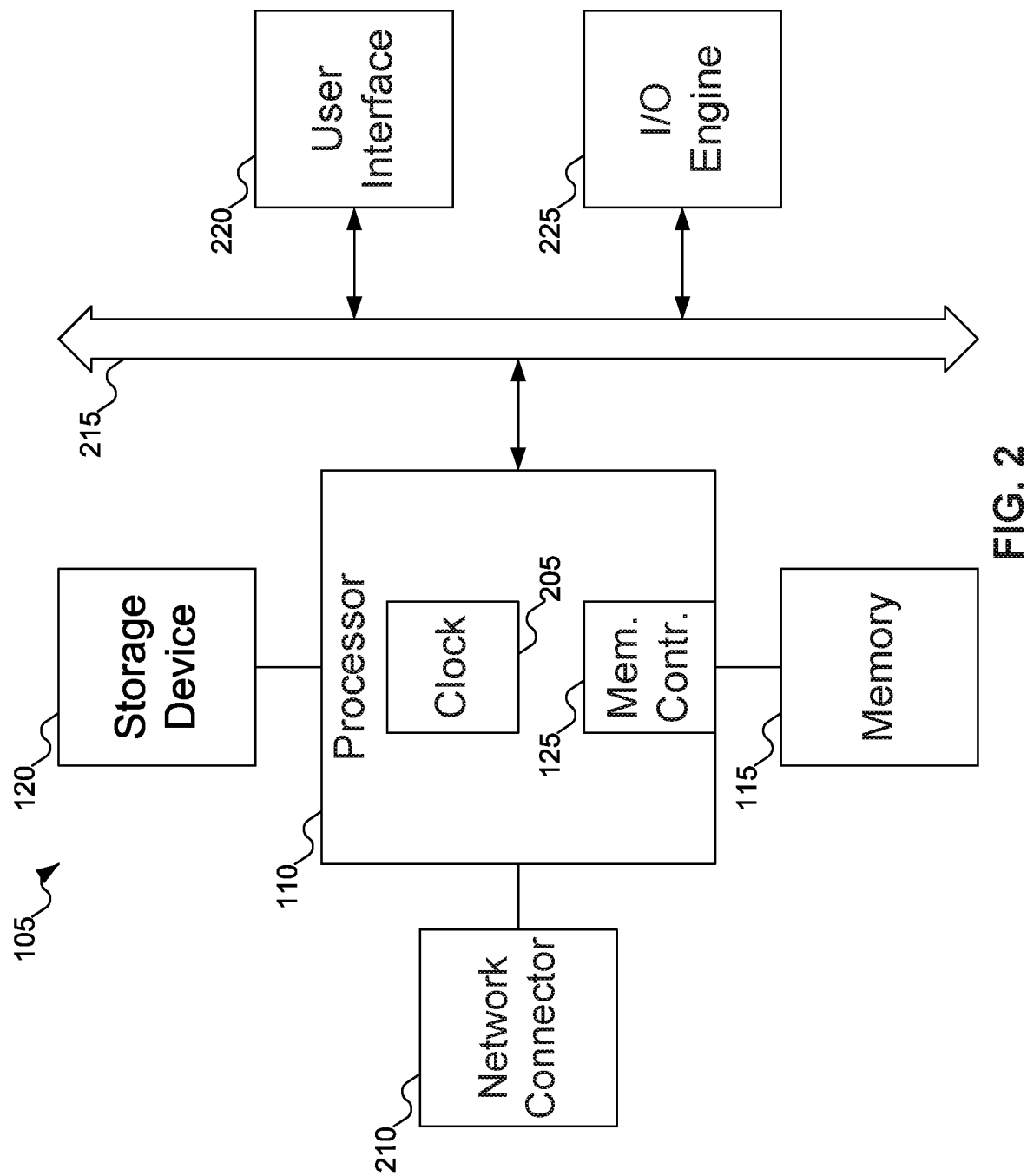
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 120 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 125, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
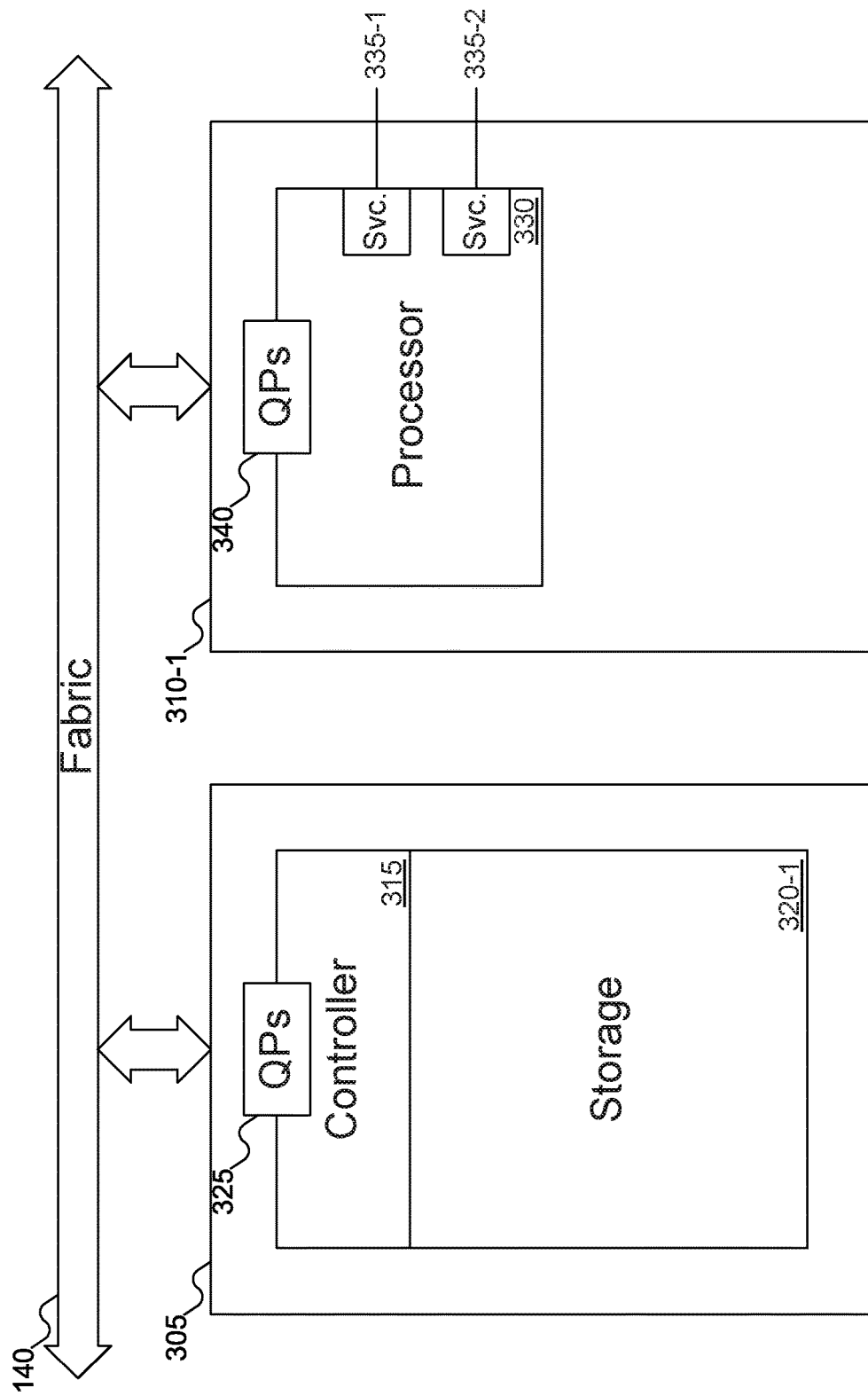
FIG. 3A shows a first example arrangement of a computational storage unit that may be associated with the storage device of FIG. 1, according to embodiments of the disclosure.

FIGS. 3A-3D show various arrangements of computational storage unit 135 of FIG. 1 (which may also be termed a "computational device" or "device") that may be associated with storage device 120 of FIG. 1, according to embodiments of the disclosure. In FIG. 3A, storage device 305 and computational device 310-1 are shown. Storage device 305 may include controller 315 and storage 320-1, and may be reachable across queue pairs: queue pairs 325 may be used both for management of storage device 305 and to control I/O of storage device 305.

Computational device 310-1 may be paired with storage device 305. Computational device 310-1 may include any number (one or more) processors 330, which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Computational device 310-1 may be reachable across queue pairs 340, which may be used for both management of computational device 310-1 and/or to control I/O of computational device 310-1.

Processor 330 may be thought of as near-storage processing: that is, processing that is closer to storage device 305 than processor 110 of FIG. 1. Because processor 330 is closer to storage device 305, processor 330 may be able to execute commands on data stored in storage device 305 more quickly than for processor 110 of FIG. 1 to execute such commands. While not shown in FIG. 3A, processors 330 may have associated memory which may be used for local execution of commands on data stored in storage device 305. This associated memory may include local memory similar to memory 115 of FIG. 1, on-chip memory (which may be faster than memory such as memory 115, but perhaps more expensive to produce), or both.

While FIG. 3A shows storage device 305 and computational device 310-1 as being separately reachable across fabric 140, embodiments of the disclosure may also include storage device 305 and computational device 310-1 being serially connected (as shown in FIG. 1). That is, commands directed to storage device 305 and computational device 310-1 might both be received at the same physical connection to fabric 140 and may pass through one device to reach the other. For example, if computational device 310-1 is located between storage device 305 and fabric 140, computational device 310-1 may receive commands directed to both computational device 310-1 and storage device 305: computational device 310-1 may process commands directed to computational device 310-1, and may pass commands directed to storage device 305 to storage device 305.

Similarly, if storage device 305 is located between computational device 310-1 and fabric 140, storage device 305 may receive commands directed to both storage device 305 and computational device 310-1: storage device 305 may process commands directed to storage device 305 and may pass commands directed to computational device 310-1 to computational device 310-1.

Services 335-1 and 335-2 may offer a number of different functions that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also any combination of such functions. Table 1 lists some examples of services that may be offered by processor 330.

TABLE 1

| Service Types |
|---|
| Compression |
| Encryption |
| Database filter |
| Erasure coding |
| RAID |
| Hash/CRC |
| RegEx (pattern matching) |
| Scatter Gather |
| Pipeline |
| Video compression |
| Data Deduplication |
| Operating System Image Loader |
| Container Image Loader |
| Berkeley packet filter (BPF) loader |
| FPGA Bitstream loader |
| Large Data Set |

Processors 330 (and, indeed, computational device 310-1) may be implemented in any desired manner. Example implementations may include a local processor, such as Central Processing Unit (CPU) or some other processor, a Graphics Processing Unit (GPU), a General Purpose GPU (GPGPU), a Data Processing Unit (DPU), and a Tensor Processing Unit (TPU), among other possibilities. Processors 330 may also be implemented using a Field Programmable Gate Array (FPGA) or an Application-Specific Integrated Circuit (ASIC), among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Figure 3B:
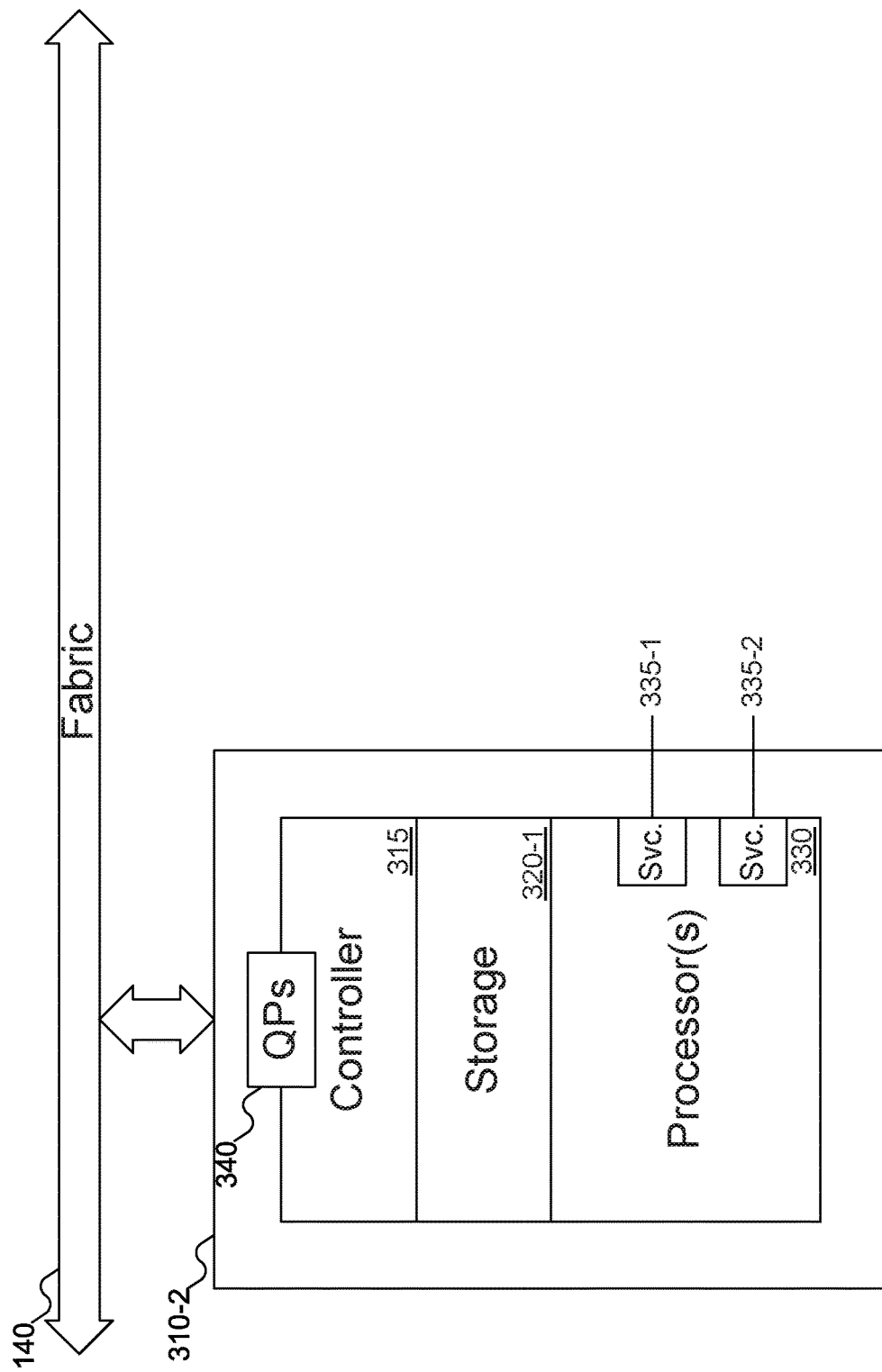
FIG. 3B shows a second example arrangement of a computational storage unit that may be associated with the storage device of FIG. 1, according to embodiments of the disclosure.

Whereas FIG. 3A shows storage device 305 and computational device 310-1 as separate devices, in FIG. 3B they may be combined. Thus, computational device 310-2 may include controller 315, storage 320-1, and processor(s) 330 offering services 335-1 and 335-2. As with storage device 305 and computational device 310-1 of FIG. 3A, management and I/O commands may be received via queue pairs 340. Even though computational device 310-2 is shown as including both storage and processor(s) 330, FIG. 3B may still be thought of as including a storage device that is associated with a computational storage unit.

Figure 3C:
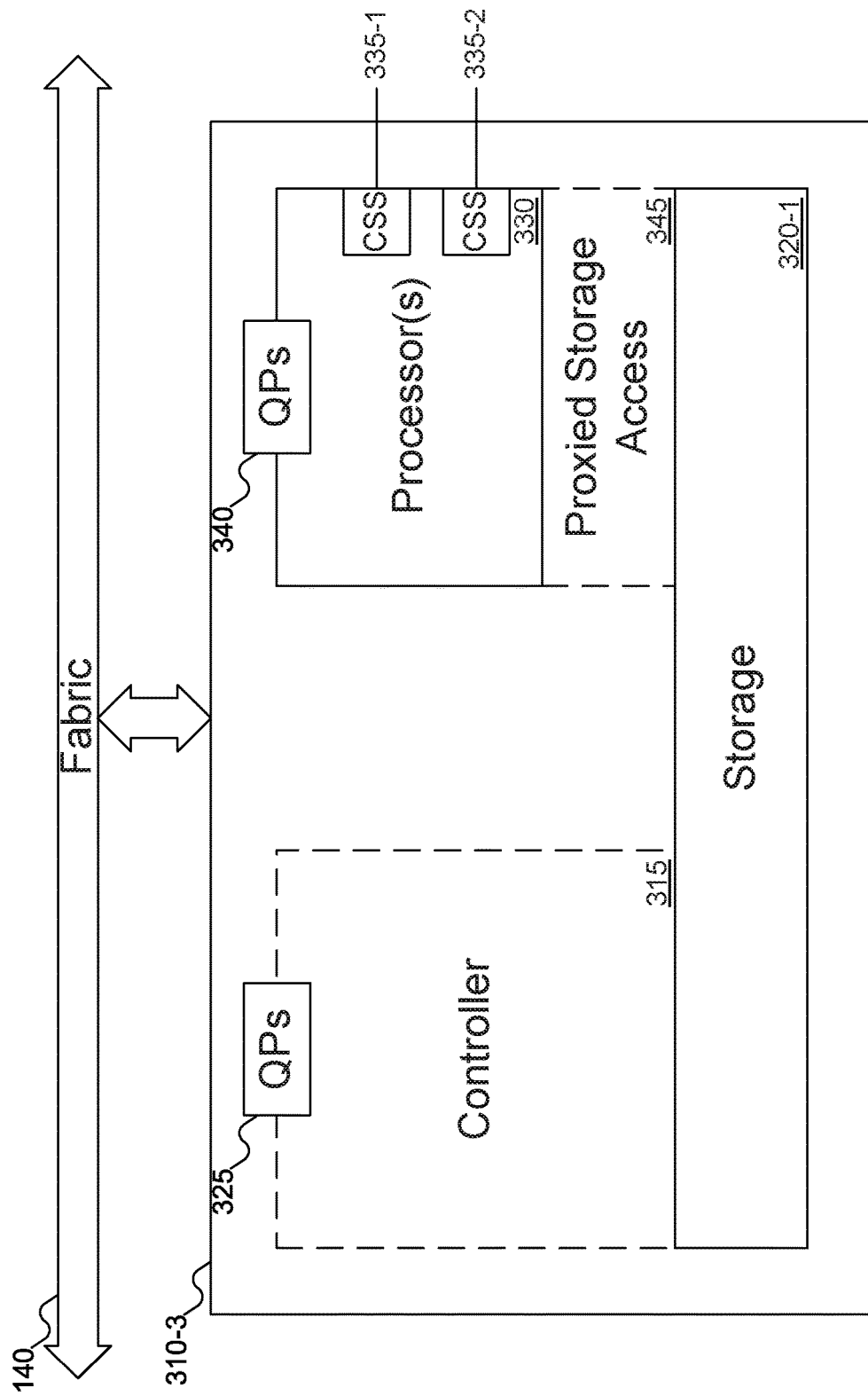
FIG. 3C shows a third example arrangement of a computational storage unit that may be associated with the storage device of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2. But even though computational device 310-3 may be thought of as a single component including controller 315, storage 320-1, and processor(s) 330 (and also being thought of as a storage device associated with a computational storage unit), unlike the implementation shown in FIG. 3B controller 315 and processor(s) 330 may each include their own queue pairs 325 and 340 (again, which may be used for management and/or I/O). By including queue pairs 325, controller 315 may offer transparent access to storage 320-1 (rather than requiring all communication to proceed through processor(s) 330).

In addition, processor(s) may have proxied storage access 345 to use to access storage 320-1. Thus, instead of routing access requests through controller 315, processor(s) 330 may be able to directly access the data from storage 320-1.

In FIG. 3C, both controller 315 and proxied storage access 345 are shown with dashed lines to represent that they are optional elements, and may be omitted depending on the implementation.

Figure 3D:
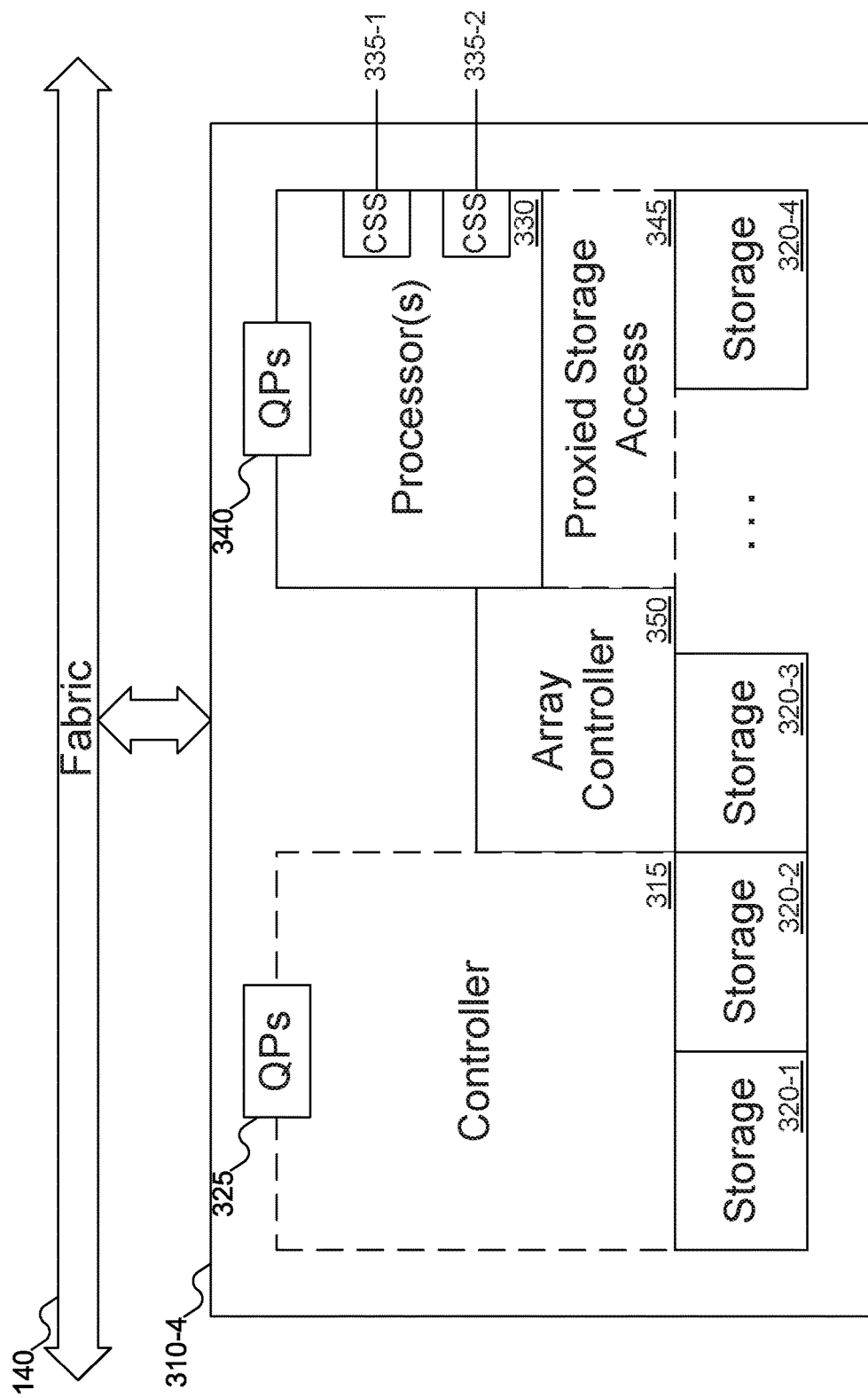
FIG. 3D shows a fourth example arrangement of a computational storage unit that may be associated with the storage device of FIG. 1, according to embodiments of the disclosure.

Finally, FIG. 3D shows yet another implementation. In FIG. 3D, computational device 310-4 is shown, which may include an array. Similar to computational device 310-3 of FIG. 3C, the array may include one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 350. Array controller 350 may manage how data is stored on and retrieved from storage elements 320-1 through 320-4. For example, if storage elements 320-1 through 320-4 are implemented as some level of a Redundant Array of Independent Disks (RAID), array controller 350 may be a RAID controller. If storage elements 320-1 through 320-4 are implemented using some form of Erasure Coding, then array controller 350 may be an Erasure Coding controller.

Figure 4A:
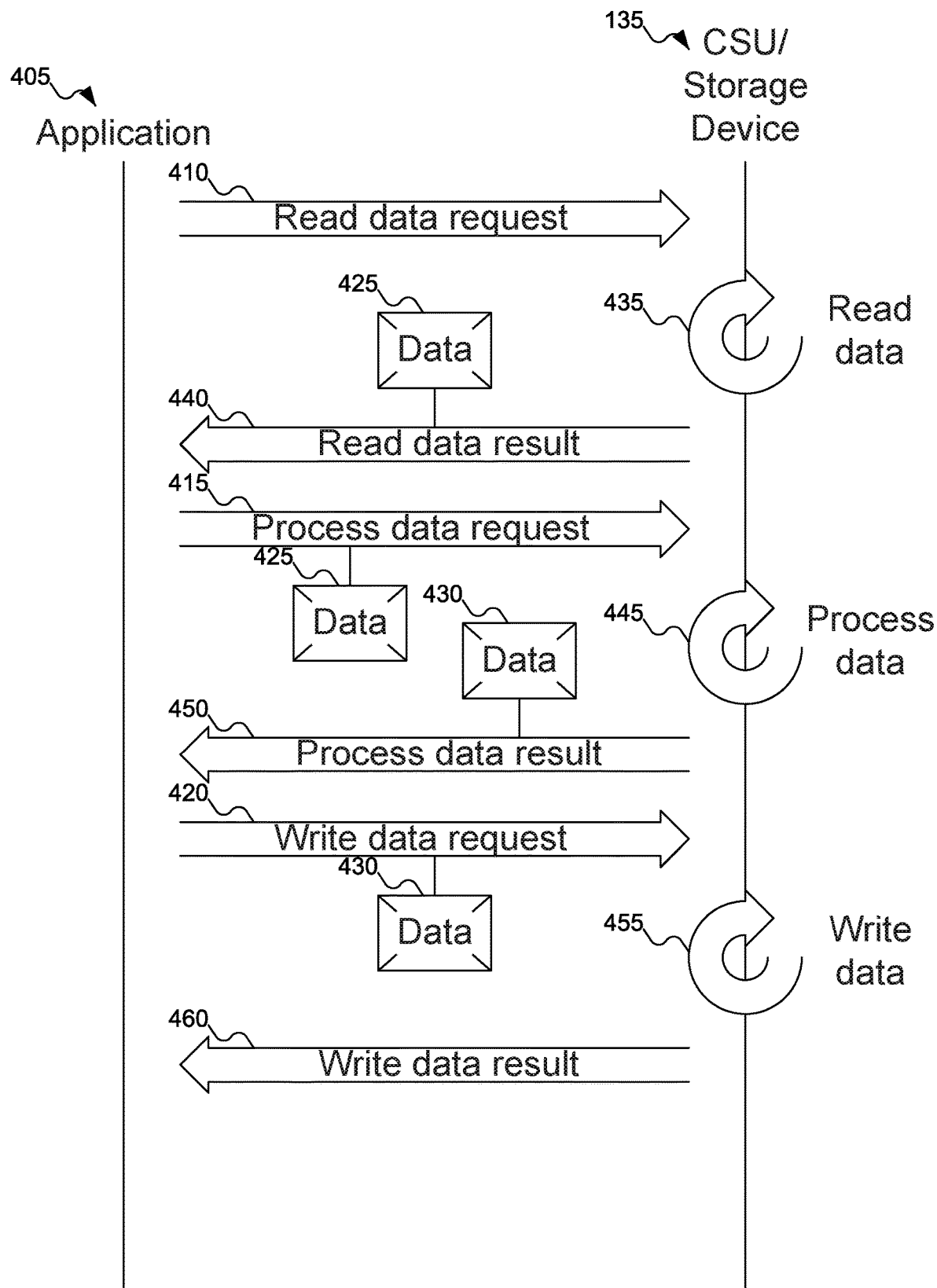
FIG. 4A shows the computational storage unit of FIG. 1 handing individual requests, according to embodiments of the disclosure.
Figure 4B:
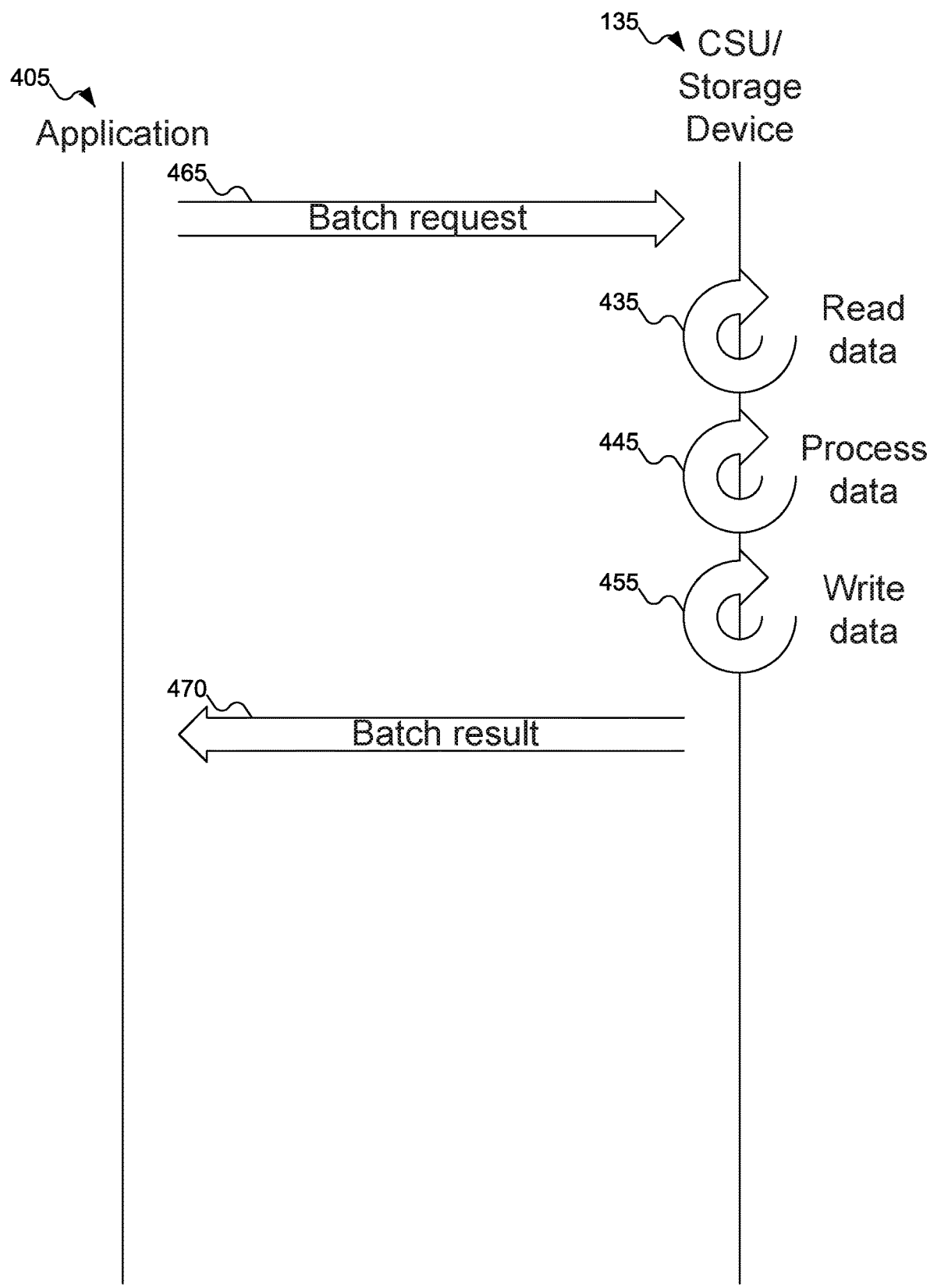
FIG. 4B shows the computational storage unit of FIG. 1 handing a batch request, according to embodiments of the disclosure.

FIGS. 4A-4B compare computational storage unit 135 of FIG. 1 handing individual requests with handing batch requests, according to embodiments of the disclosure. In FIG. 4A, application 405 may send individual requests, such as read data request 410, process data request 415, and write data request 420. For example, read data request 410 might be a request to read data from a database, process data request 415 might be a request to filter the data according to some criteria (provided to computational storage unit 135 as data 425 attached to process data request 415), and write data request 420 might be a request to write filtered data 430 back to storage device 120 of FIG. 1. (Note that computational storage unit 135 may be capable of performing this sequence as an offered service, in which case computational storage unit 135 might be able to read the data from storage device 120 of FIG. 1 and write the filtered data back to storage device 120 of FIG. 1 without application 405 having to send specific requests to perform those steps. This example is intended to be a simplified example to case understanding rather than representative of a real-world situation. In addition, the introduction of additional processing requests between read data request 410 and write data request 420 might mean that computational storage unit 135 could need to be sent individual process requests.)

Because each of requests 410, 415, and 420 is considered a separate request, computational storage unit 135 may respond to each request in turn, returning a result therefrom. Thus, after computational storage unit 135 executes read data request 410 (shown as processing 435), computational storage unit 135 may return read data result 440, which may include data 425 read from storage device 120 of FIG. 1. Similarly, after computational storage unit 135 executes process data request 415 (shown as processing 445), computational storage unit 135 may return process data result 450, which may include filtered data 430. And after computational storage unit 135 executes write data request 420 (shown as processing 455), computational storage unit 135 may return write data result 460.

Note that because each request is mirrored with a result returned from computational storage unit 135, multiple messages are sent between application 405 and computational storage unit 135: each request involves two messages (one to send the request, one to return the result). In addition, some messages may include data sent between application 405 and computational storage unit 135. If the data to be sent is large, sending that data may limit other data (or messages) that may be sent between application 405 (or more generally, processor 110 of FIG. 1, which may be running other applications or processes as well) and computational storage unit 135.

Note too that the various messages may include the redundant transmission of data. For example, data read result 440 may include data 425, including the data that application 405 requested to be read. But application 405 may then immediately send data 425 back in process data request 415, meaning that the data is sent twice: once from computational storage unit 135 to application 405, and once from application 405 back to computational storage unit 135. Since data 425 was available on storage device 120 already, sending the data back and forth in this manner uses bandwidth to little benefit. The transmission of filtered data 430 back and forth between computational storage unit 135 and application 405 similarly serves little purpose.

Instead of sending individual requests 410, 415, and 420, application 305 might send a single batch request, that specifies all three individual requests. Computational storage unit 135 may then process all three requests as though they were a single request, and return a single result of the overall batch request. This situation is shown in FIG. 4B.

In FIG. 4B, application 405 may send batch request 465, which may instruct computational storage unit 135 how to execute the sequence of requests 410, 415, and 420 of FIG. 4A. Computational storage unit 135 may then execute each individual request (shown as processing 435, 445, and 455), and then return batch result 470 of the batch request. Thus, computational storage unit 135 may save bandwidth between processor 110 and computational storage unit 135 by omitting messages 440 and 450 of FIG. 4A. Further, because computational storage unit 135 may avoid sending data 425 of FIG. 4A back to application 405, the bandwidth between processor 110 and computational storage unit 135 is further reduced by twice the size of data 425 of FIG. 4A and filtered data 430 of FIG. 4A (since each is sent twice: once from computational storage unit 135 to application 405, and once from application 405 to computational storage unit 135).

The example above, aside from being simplified for understanding, also assumes a serial sequence of requests.

That is, read data request 410 of FIG. 4A is executed first, then process data request 415 of FIG. 4A is executed, then write data request 420 of FIG. 4A is executed. But batch requests may also support structures other than serial requests, as described below in FIGS. 5A-5C.

FIGS. 5A-5C show three different structures for batch requests 465 of FIG. 4B, according to embodiments of the disclosure. In FIG. 5A, serial batch request 465-1 is shown. Similar to the example of FIG. 4B above, serial batch request 465-1 may include three requests: input request 505-1, compute request 510-1, and output request 515-1. Input request 505-1 could be analogous to read data request 410 of FIG. 4A. Aside from reading data from storage device 120 of FIG. 1, data could be transferred from memory 115 of FIG. 1 to computational storage unit 135 of FIG. 1; other input requests may also be used. Compute request 510-1 could be analogous to process data request 415 of FIG. 4A, and may be any request to manipulate data in some manner. Output request 515-1 could be analogous to write data request 420 of FIG. 4A. Aside from writing data to storage device 120 of FIG. 1, data could be transferred from computational storage unit 135 of FIG. 1 to memory 115 of FIG. 1; other output requests may also be used. While FIG. 5A shows three requests in serial batch request 465-1, serial batch request 465-1 may include any number of requests (although batch request 465-1 may typically include at least two requests), which may include any number (zero or more) of input requests 505-1, compute requests 510-1, and/or output requests 515-1, and in any desired order.

In FIG. 5B, parallel batch request 465-2 is shown. Parallel batch request 465-2 is shown as including five compute requests 510-2 through 510-6, which may be executed in parallel. For requests to be executed in parallel, the requests may not depend on each other: that is, for any pair of compute requests 510-2 through 510-6—say, compute requests 510-2 and 510-3—compute request 510-2 may not depend on compute request 510-3, and compute request 510-3 may not depend on compute request 510-2. As an analogy consider the concepts of Single Instruction, Multiple Data (SIMD) and Multiple Instruction, Single Data (MISD) from parallel computing: the same data might be processed using several different compute requests, or the same compute request might be applied to several different data. So long as there is no dependency between one request and another, the requests may be performed in parallel. (Of course, parallel batch request 465-2 could also include different compute requests, each applied to different data.)

While FIG. 5B shows five compute requests 510-2 through 520-6 in parallel batch request 465-2, parallel batch request 465-2 may include any number (zero or more, although typically parallel batch request 465-2 may include at least two) of compute requests. In addition, while parallel batch request 465-2 includes only compute requests, parallel batch request 465-2 may include input requests, output requests, or any desired combination of input, compute, and output requests.

Finally, FIG. 5C shows hybrid batch request 465-3. Hybrid batch request 465-3 may include some requests that are in parallel and some requests that are serial. For example, input requests 505-7 and 505-8 may be executed in parallel, as may compute requests 510-7 and 510-8 and compute requests 515-9 and 515-10. But the results of compute requests 515-8 and 515-10 may both provide data for compute request 515-11, which may be serially followed by output request 515-7. In essence, a hybrid batch structure may be used when a batch request is neither strictly serial nor strictly parallel.

Hybrid batch request 465-3 shows a total of eight requests (two input requests, five compute requests, and one output request). As with serial batch request 465-1 and parallel batch request 465-2, hybrid batch request 465-3 may include any number (zero or more, although typically hybrid batch request 465-3 may include at least two) of requests, in any desired combination.

While the above discussion suggests that there may be some relationship between the various requests in a batch request, the specific nature of the relationship(s) between requests in a batch request may be quite broad. Below are some example relationships that may exist between requests (embodiments of the disclosure may also include other relationships).

In some embodiments of the disclosure, two (or more) requests may load storage data in parallel from different dies/NVM sets/namespaces. By having requests load data from different portions of storage, it may be possible to perform such requests in parallel, potentially reducing the overall execution time.

In some embodiments of the disclosure, two (or more) requests may break a larger job into smaller jobs that may run on similar computational devices. By having requests executed using different computational devices, it may be possible to perform such requests in parallel, potentially reducing the overall execution time.

In some embodiments of the disclosure, two (or more) requests may depend on certain device memory being closer/faster for certain computational services: for example, FPGA local private memory vs. FPGA shared DRAM. By using memory that is closer or faster to storage for computational services, overall execution time may be reduced.

In some embodiments of the disclosure, two (or more) requests may be more efficient/provide better performance that a single copy for certain device direct memory access (DMA) engines. For example, it may be more efficient to use multiple requests (each of which may be smaller) that may be interspersed with other requests, rather than having the computational device execute a single request that runs continuously to completion.

In some embodiments of the disclosure, two (or more) requests may manage compute and storage requests in a batch request to use device memory in a manner that avoids overlap with another batch request. For example, if the computational device includes two memory banks as device memory, the first batch allocations may use one memory bank while the second batch allocations may use the other memory, thereby avoiding memory contention. By having requests use different storage areas, it may be possible to perform such requests in parallel, potentially reducing the overall execution time.

In some embodiments of the disclosure, two (or more) requests may be batched to leverage use of a component that might perform better in a batch request than as a standalone request. For example, a certain service may be implemented in a hardware ASIC that might have a poor latency when reporting back to the host and a better latency when reporting to another component in the computational device. By having requests processed using components that best suit overall execution, it may be possible to reduce the overall execution time.

Figure 6:
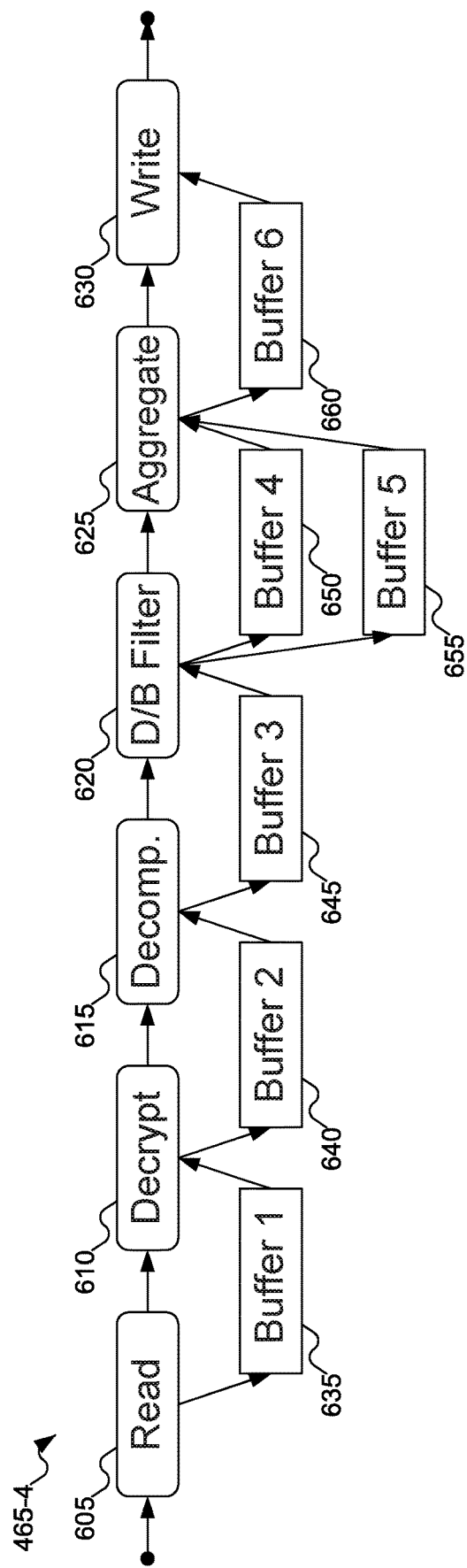
FIG. 6 shows an example batch request with buffers used to store data during processing of the batch request of FIG. 4B, according to embodiments of the disclosure.

FIG. 6 shows an example batch request with buffers used to store data during processing of the batch request of FIG. 4B, according to embodiments of the disclosure. In FIG. 6, batch request 465-4 is shown. As may be seen, batch request 465-4 includes a number of requests, to be executed sequentially, which means that batch request 465-4 may be a serial batch request. Batch request 465-4 may be an example of a batch request to process data in a database.

Batch request 465-4 starts with read request 605 to read data from a database on storage device 120 of FIG. 1: read request 605 may be a form of an input request. Decrypt request 610, which, along with various requests below, may be a form of a compute request, may be executed to decrypt encrypted data from the database. After decryption, decompression request 615 may be executed, to decompress the (decrypted) data. After decompression, database filter request 620 may be executed to filter the data. After filtering, aggregate request 625 may be executed to combine the filtered data in a desired manner. Finally, write request 630, which may be a form of an output request, may write the processed data back to storage device 120 of FIG. 1 for later use.

Each request 605 through 630 may specify various buffers that may be used for input and/or output purposes (which may also be termed the source and destination for the requests). For example, buffer 635 may be used as an output buffer where the data read by read request 605 may be stored. Buffer 635 may serve as an input buffer to decrypt request 610, and buffer 640 may serve as an output buffer for decrypt request. Buffers 640 and 645 may serve as the input and output buffers, respectively, for decompression request 615.

Note that database filter request 620 may specify buffer 645 as an input buffer, and may specify two output buffers 650 and 655. Similarly, note that aggregate request 625 may specify both buffers 650 and 655 as input buffers, with buffer 660 as an output buffer. Thus, a particular request might specify more than one input buffer and/or more than one output buffer. For example, database filter request 620 might filter the data from the database along two different axes, with aggregate request 625 combining the results of those filters in some desired manner. Finally, write request 630 may specify buffer 660 as the input buffer, with no output buffer.

The various buffers 635 through 660 may be specified as locations in some memory (such as a DRAM or on-chip memory of computational storage unit 135 of FIG. 1) where data may be temporarily stored. For example, buffers 635 through 660 may include various address ranges in some such memory. Data may be written to and/or read from these buffers by the various requests: the use of these buffers may be used to determine whether a particular request depends on data from another request. For example, since read request 605 may write data to buffer 635 and decrypt request 610 may read buffer 635, decrypt request 610 may be determined to depend on read request 605 having completed first. How this dependency information is determined is discussed further with reference to FIG. 12 below.

Figure 7:
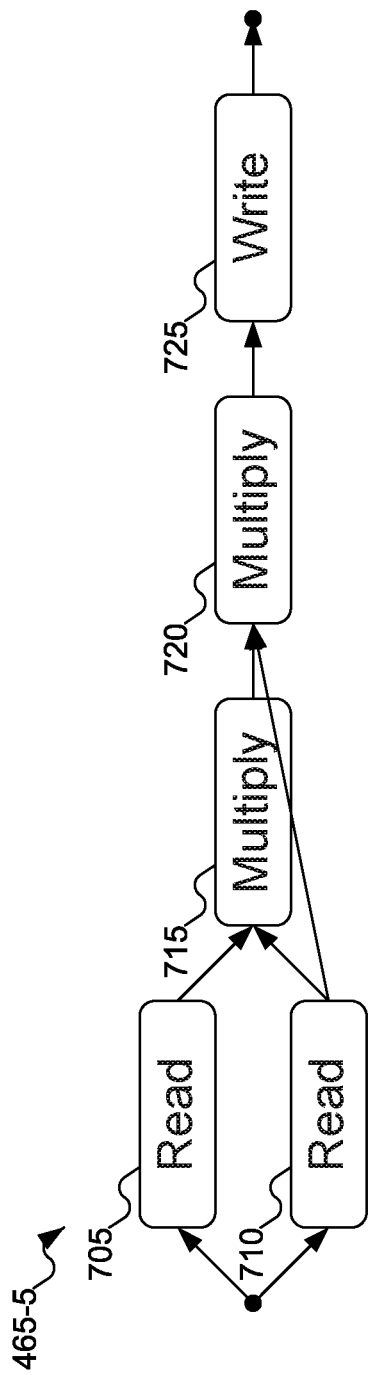
FIG. 7 shows another example batch request of FIG. 4B with data being reused, according to embodiments of the disclosure.

FIG. 7 shows another example batch request of FIG. 4B with data being reused, according to embodiments of the disclosure. In FIG. 7, batch request 465-5 is shown. Batch request 465-5 may represent a batch request to perform, for example, a matrix multiplication sequence (A×B)×B. Read requests 705 and 710 may read matrices A and B from various sources: for example, matrix A may be read from storage device 120 of FIG. 1, whereas matrix B may be transferred from memory 115 of FIG. 1. Multiply request 715 may then perform the first matrix multiplication of (A×B). Multiply request 720 may then perform the second matrix multiplication of (A×B)×B. Finally write request 725 may write the result of the matrix multiplication back to storage device 120 of FIG. 1 or to memory 115 of FIG. 1, as desired.

Note that in FIG. 7, the result of read request 710 is used twice: first by multiply request 715, and then again by multiply request 715. This shows that a particular buffer (not shown in FIG. 7) may be used as inputs to multiple subsequent requests: a buffer is not necessarily free to be reused after the next request is performed: the last request to access the buffer should complete before the buffer may safely be erased.

Figure 8:
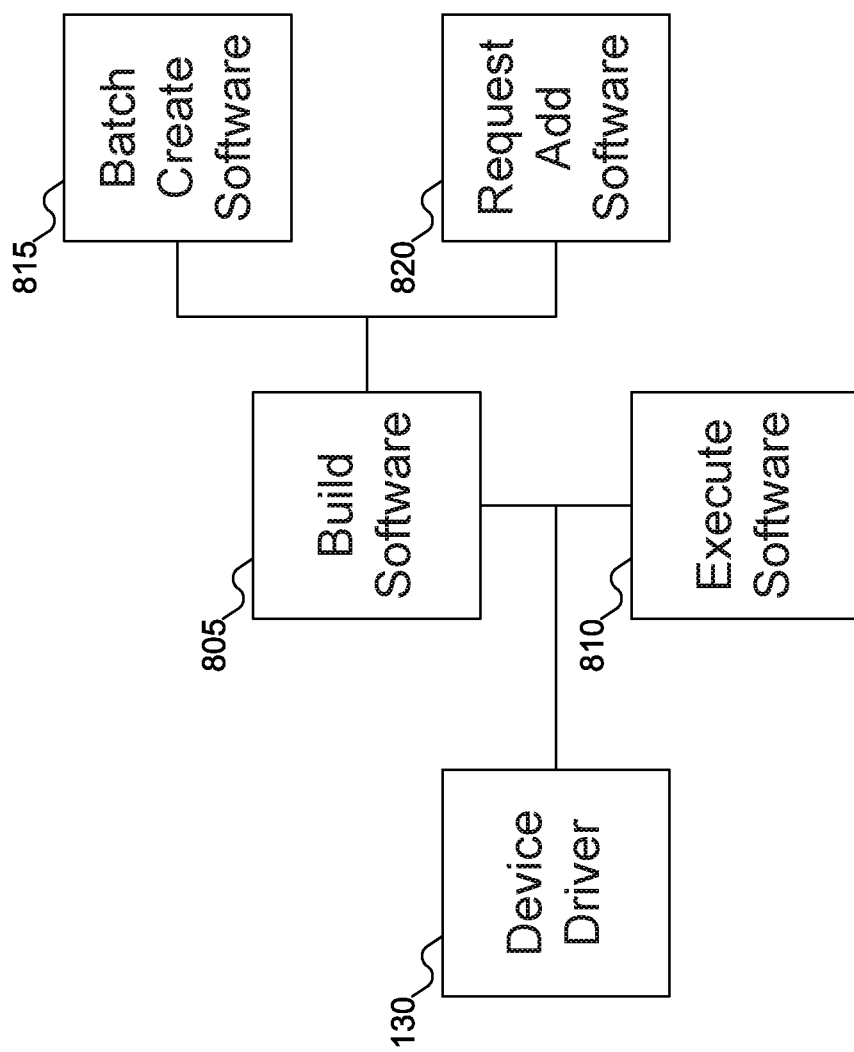
FIG. 8 shows details of software used to build batch requests, according to embodiments of the disclosure.

FIG. 8 shows details of software used to build batch requests, according to embodiments of the disclosure. In FIG. 8, device driver 130 is shown. Device driver is shown as including build software 805 and execute software 810, with build software 805 including batch create software 815 and request add software 820. Build software 805 may be responsible for building batch request 465 of FIG. 4B (and all variations thereof shown in FIGS. 5A-7). Batch create software 815 may be used by application 405 of FIG. 4B to request that a new batch request be created. Request add software 820 may be used to add a request to an existing batch request. In using request add software 820, application 405 of FIG. 4B may identify the batch request to which the new request should be added, information about the request to be added, information about where in the structure of the batch request the new request should be inserted (for example, that the new request should be inserted before and/or after existing requests in the batch request), and information about the buffer(s) to be used for input and output of data for the new request.

Execute software 810, on the other hand, may be used to send a batch request to computational storage unit 135 of FIG. 1. Application 405 of FIG. 4B may specify the computational storage unit to which the batch request should be sent (which may be identified using some identifier that is unique within system 105 of FIG. 1, at least), along with an identifier of the batch request to be processed. Execute software 810 may also be called queueing software, in that the software queues up a batch request for execution by computational storage unit 135 of FIG. 1.

Batch software 805 and execute software 820 are shown as part of device driver 130, on the theory that device driver 130, as the interface to storage device 120 of FIG. 1 and/or computational storage unit 135 of FIG. 1, may be the interface to send batch request 465 of FIG. 4B to computational storage unit 135 of FIG. 1. But batch software 805 and execute software 820 may reside anywhere within system 105 of FIG. 1. By making batch software 805 and execute software 820 part of an Application Programming Interface (API), the creation and use of batch request 465 of FIG. 4B may be abstracted away both from application 405 of FIG. 4B (and the hardware of machine 105 of FIG. 1) and from computational storage unit 135 of FIG. 1. That is, with batch software 805 and execute software 820 being part of an API, batch request 465 of FIG. 4B may be constructed without any knowledge of the particular hardware and/or functionality offered by computational storage unit 135 of FIG. 1. In this manner, batch request 465 of FIG. 4B may be used with any computational storage unit available within system 105 of FIG. 1. (This generalization does lead to a potential question—what if computational storage unit 135 of FIG. 1 lacks the necessary hardware to execute batch request 465 of FIG. 1, either in whole or in part—which will be addressed below with reference to FIG. 11.)

While not shown in FIG. 8, other software may also be included as part of batch software 805. For example, to mirror batch create software 815, there may be software to free an existing batch request that is no longer needed. There may also be other commands available as part of batch software 805, such as commands to resize a batch request (to add space for further requests, to release space that is no longer needed for requests, and to reconfigure a batch request. Table 2 shows various commands, along with descriptions and parameter lists that may be used, although Table 2 should not be considered an exhaustive list of such commands (the command names and parameter lists may vary depending on embodiments of the disclosure).

TABLE 2

| Command Name | Function | Parameters |
| --- | --- | --- |
| csAllocBatchRequest | Create a new batch request | Mode: the structure of the batch request (serial, parallel, or hybrid) MaxReqs: the maximum number of requests expected for this batch request BatchHandle: a pointer to the data structure storing the batch request |
| csFreeBatchRequest | Release the space used by an existing batch request | BatchHandle: a pointer to the data structure storing the batch request |
| csAddBatchEntry | Add a request to an existing batch request | BatchHandle: a pointer to the data structure storing the batch request Req: a new request to add to the batch request Before: an identifier of the request to come before the added batch request After: an identifier of the request to come after the added batch request |
| csHelperConfigBatchEntry | Change a parameter of an existing batch request | BatchHandle: a pointer to the data structure storing the batch request Entry: an identifier of the request to be configured Req: a pointer to the data structure with |

TABLE 2-continued

| Command Name | Function | Parameters |
| --- | --- | --- |
| | | the configuration information |
| csHelperResizeBatchRequest | Increase or decrease the number of requests in an existing batch request | BatchHandle: a pointer to the data structure storing the batch request<br>MaxReqs: the new maximum number of requests for this batch request |
| csQueueBatchRequest | Queue a batch request for execution by a computational storage unit | BatchHandle: a pointer to the data structure storing the batch request<br>ReqContext: a context for the batch request<br>CallbackFn: a pointer to a function to be invoked when the batch request has completed<br>EventHandle: an identifier of an event to be triggered upon completion of the batch request |

FIG. 9 shows various example data structures that may be used to store batch request 465 of FIG. 4B, according to embodiments of the disclosure. In FIG. 9, data structures 905, 910, and 915 are shown. Data structures 905, 910, and 915 are various different ways in which batch request 465 of FIG. 4B may be stored. FIG. 9 is not meant to be an exhaustive list of data structures that may be used to store batch request 465 of FIG. 4B: other data structures may also be used.

In data structure 905, batch request 465 of FIG. 4B may include the type of structure—serial, parallel, or hybrid—for batch request 465 of FIG. 4B (an enumeration is used to assign values to descriptive constant names), the length of batch request 465 of FIG. 4B (that is, the number of individual requests in batch request 465 of FIG. 4B), and one of three different data structures (used to copy data to or from memory, used to process data, or used to read or write data from storage device 120). These data structures may themselves include multiple individual requests (for example, stored in an array or connected as linked lists), and may include configuration information, such as the address from where data should be read (from storage), written (to storage), or copied (to or from memory).

Data structure 910 is similar to data structure 905, except that data structure 910 explicitly includes a pointer to the next batch request that may be queued up for execution (rather than letting the API handle such management) and dependency information regarding the requests in batch request 465 of FIG. 4B. (Rather than labeling the mode with an enumeration, a different data structure is used for this information in data structure 910, but the effect is the same.)

Data structure 915 is similar to data structure 910, but without storing the pointer to the next queued batch request or the dependency information. When data structure 915 is used to describe a particular request in a batch request, an array of such data structures may be used to describe the entire batch request, each entry in the array describing one particular request in the batch request.

FIG. 10 shows an example snippet of code that may use batch request 465 of FIG. 4B, according to embodiments of the disclosure. In FIG. 10, code 1005 is shown. Code 1005 is merely exemplary, and it should be understood that code 1005 may not be complete: other code may be needed to complete the program.

In code 1005, at line 1, batch request 465 of FIG. 4B may be created. At lines 2-4, requests to store, compute, and copy (from memory) are added to batch request 465 of FIG. 4B. The individual requests are added from last to first: the store request would be the last request processed in batch request 465 of FIG. 4B, and the copy request would be the first request processed in batch request 465 of FIG. 4B.

At line 5, a loop is started, which operates while the file still has data to process. At line 6, batch request 465 of FIG. 4B may be queued up for execution by computational storage unit 465 of FIG. 4B. At line 7, the size of the file may be reduced by the amount of data processed, and at line 8, the location where the next chunk of data to be stored may be identified. At line 9, with the update to the location where data is to be stored, the store request in batch request 465 of FIG. 4B may be reconfigured. At this point, the loop (started at line 5) is complete, and may iterate as described until all the data in the file has been processed. Finally, at line 10, with batch request 465 of FIG. 4B no longer needed, batch request 465 of FIG. 4B may be released and the storage used by batch request 465 of FIG. 4B may be reclaimed.

Figure 11:
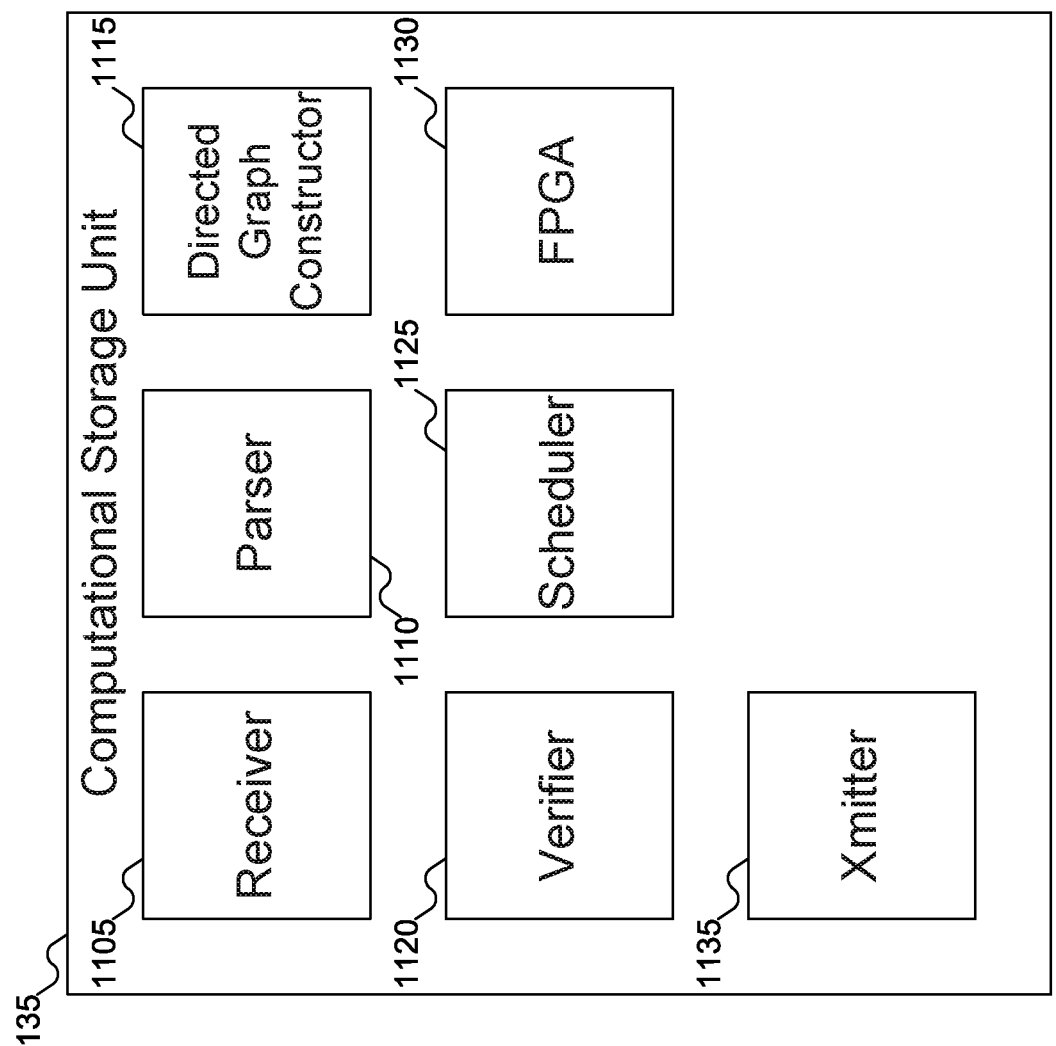
FIG. 11 shows details of the computational storage unit of FIG. 1 designed to process batch requests, according to embodiments of the disclosure.

FIG. 11 shows details of computational storage unit 135 of FIG. 1 designed to process batch requests, according to embodiments of the disclosure. In FIG. 11, computational storage unit 135 may include receiver 1105, parser 1110, directed graph constructor 1115, verifier 1120, scheduler 1125, hardware 1130, and transmitter 1135. Receiver 1105 may receive batch request 465 of FIG. 4B from application 405 of FIG. 4B (more precisely, receiver 1105 may receive batch request 465 of FIG. 4B from the API or other software: but as those elements may act on behalf of application 405 of FIG. 4B, these elements may be thought of as agents operating on behalf of application 405 of FIG. 4B). Parser 1110 may parse the data structure of batch request 465 of FIG. 4B to identify the individual requests that are part of batch request 465 of FIG. 4B. Parser 1110 may operate by walking through the requests that make up batch request 465 of FIG. 4B, as defined within the data structure for batch request 465 of FIG. 4B.

Directed graph constructor 1115 may construct a directed graph of the dependencies among the various requests in batch request 465 of FIG. 4B. Verifier 1120 may verify that the directed graph created by directed graph creator 1115 is acyclic. The operation of directed graph constructor 1115 and verified 1120 are discussed further with reference to FIG. 12 below.

Scheduler 1125 may take the directed graph produced by directed graph constructor 1115 and use that information to schedule the various requests in batch request 465 of FIG. 4B for execution. If an individual request has no dependencies or all its dependencies have been satisfied, then scheduler 1125 may schedule that request for execution immediately; other requests may wait until their dependencies have been satisfied before they may be executed.

Scheduler 1125 may also manage scheduling requests for two or more batch requests 465 of FIG. 4B, and may manage their relative execution. For example, if there are two batch requests 465 of FIG. 4B both waiting for a particular piece of hardware to execute (for example, two different store requests to write data to storage device 120 of FIG. 1), then scheduler 1125 may schedule one such request for execution, and have the other request wait until the first request has completed. (Of course, if multiple such requests may be executed in parallel based on the capabilities of computational storage unit 135 or storage device 120 of FIG. 1, then both requests may execute in parallel.)

Scheduler 1125 may also manage requests that are supposed to execute in parallel. If sufficient hardware exists to support multiple requests be executed in parallel, scheduler 1125 may use such hardware for parallel execution. If not, scheduler 1125 may implement a time-sharing arrangement within the hardware so that the multiple requests may all make progress around the same time, although each request may be paused for another request to execute (this is similar to how a single core/single thread processor may execute multiple programs at the same time: each program uses the processor for a small slice of time before being moved out of the processor to permit another program to execute).

Scheduler 1125 may also recognize that computational storage unit 135 may lack the necessary hardware to execute an individual request. For example, an individual request in batch request 465 of FIG. 4B may involve executing custom code as provided by application 405 of FIG. 4B. If computational storage unit 135 lacks a processor capable of executing this custom code, scheduler 1125 may ask some other hardware outside computational storage unit 135 to handle that particular request. This other hardware may include, for example, processor 110 of FIG. 1 of system 105 of FIG. 1, or another computational storage unit 135 of system 105 of FIG. 1. (Scheduler 1125 may also simply cause computational storage unit 135 of FIG. 1 to return an error back to application 405 of FIG. 4B if an individual request in batch request 465 of FIG. 4B may not be satisfied.)

Hardware 1130 may be any hardware (and may also include appropriate software) to execute an individual request. Hardware 1130 is shown as an FPGA, but hardware 1130 may also be implemented using a CPU or some other processor, GPU, a GPGPU, a TPU, a DPU, a BPF processor, or an ASIC, to name a few possibilities. Computational storage unit 135 may also include multiple instances of hardware 1130, which may be the same or different types of hardware and may offer the same, similar, or different functionalities (for example, different hardware 1130 to implement different compute requests). For example, one instance of hardware 1130 might include an FPGA designed to implement a specific service, whereas another instance of hardware 1130 might include a CPU that may support programs downloaded from application 405 of FIG. 4B. Finally, transmitter 1135 may transmit batch result 470 of FIG. 4B (the result of the execution of batch request 465 of FIG. 4B) back to application 405 of FIG. 4B.

Not shown in FIG. 11 are the physical interface across which receiver 1105 of may receive batch request 465 of FIG. 4B from application 405 of FIG. 4B or transmitter 1135 may transmit batch result 470 of FIG. 4B to application 405 of FIG. 4B. The various elements shown in FIG. 11 may also be implemented using hardware or software running on an appropriate processor.

Figure 12:
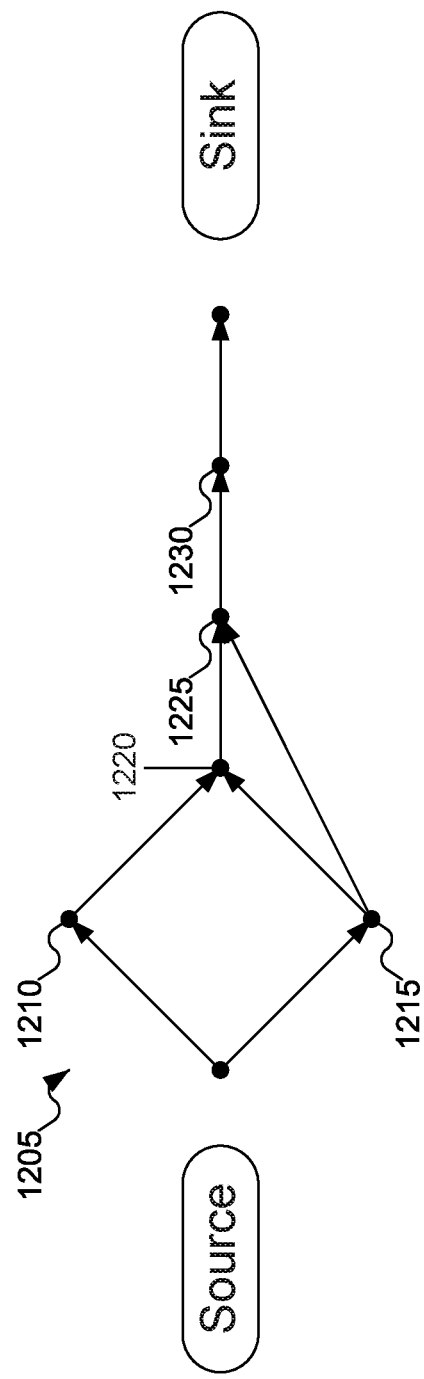
FIG. 12 shows details of an example directed graph constructed by the directed graph constructor of FIG. 11 for the batch request of FIG. 7, according to embodiments of the disclosure.

FIG. 12 shows details of an example directed graph constructed by directed graph constructor 1115 of FIG. 11 for batch request 465-5 of FIG. 7, according to embodiments of the disclosure. In FIG. 12, directed graph 1205 is shown. Directed graph 1205 includes nodes 1210, 1215, 1220, 1225, and 1230, as well as source and sink nodes (which may mark the start and end points of batch request 465 of FIG. 7). Nodes 1210, 1215, 1220, 1225, and 1230 represent, respectively, requests 705, 710, 715, 720, and 725. The arrows connecting the nodes in directed graph 1205 may represent dependencies: nodes 1210 and 1215 do not depend on any earlier requests, node 1220 depends on both nodes 1210 and 1215, node 1225 depends on both nodes 1220 and 1215, and node 1230 depends on node 1225. The arrowhead shows the direction of the dependency, with the dependent node touching the arrowhead.

Note that if the arrows were not directed (that is, there were no direction to the edges between the nodes), then nodes 1215, 1220, and 1225 would form a cycle (a closed loop). (The same could be said to be true for the source node and nodes 1210, 1215, and 1220; but the source node is typically not considered a node within the graph.) But because the edges between the nodes are directed (the edges are shown as arrows rather than undirected line segments), nodes 1215, 1220, and 1225 do not form a cycle.

On the other hand, if the arrow between nodes 1215 and 1225 were reversed (so that the arrow pointed to node 1215), then nodes 1215, 1220, and 1225 would form a cycle: node 1215 would depend on node 1225, which would depend on node 1220, which would depend on node 1215. The presence of a cycle in a directed graph representation of batch request 465 of FIG. 4B would indicate that there is a subset of requests that cannot be executed, since each node in the cycle would depend on itself. (The dependence described here would be indirect; but it is also possible for a node to depend on itself, if the arrow led from the node and back to the node, as may happen in directed graphs).

If a directed graph includes a cycle, then the batch request represented by the directed graph may not be satisfied. Verifier 1120 of FIG. 11 may verify whether there is any path, along the arrows in directed graph 1205, leading from a node back to itself. If such a path exists, then the directed graph is called cyclic; if no path exists from a node back to itself, then the directed graph is called acyclic. If the directed graph representing a batch request is acyclic, then it may be possible to execute the batch request (whether such execution is actually possible may depend on whether computational storage unit 135 of FIG. 1 includes the necessary hardware 1130 of FIG. 11 to execute the requests in batch request 465 of FIG. 4B).

Figure 13:
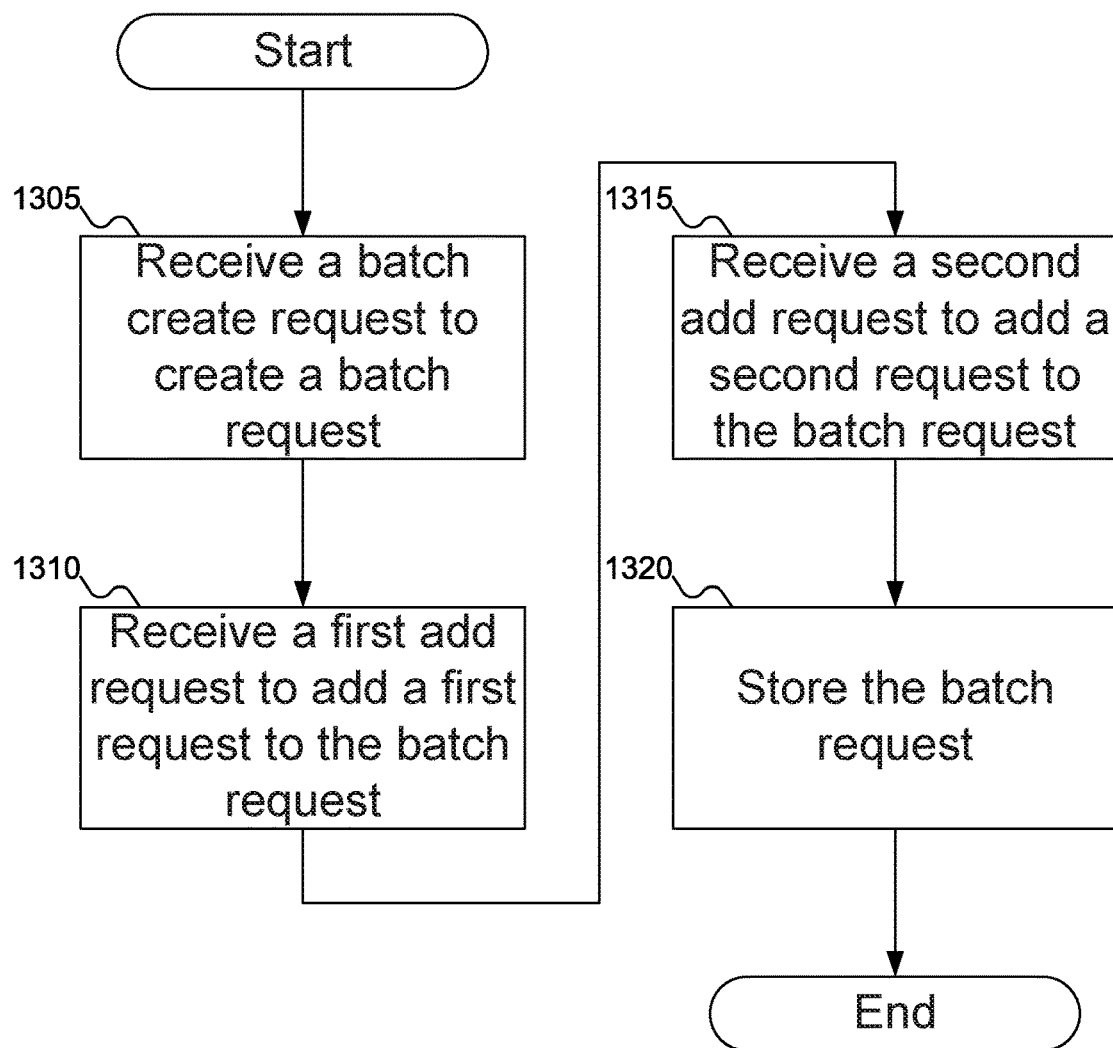
FIG. 13 shows a flowchart of an example procedure for using the software of FIG. 8 to build the batch request of FIG. 4B, according to embodiments of the disclosure.

FIG. 13 shows a flowchart of an example procedure for using the software of FIG. 8 to build the batch request of FIG. 4B, according to embodiments of the disclosure. In FIG. 13, at block 1305, batch create software 815 of FIG. 8 may receive a request to create batch request 465 of FIG. 4B. At block 1310, request add software 820 of FIG. 8 may receive a request to add to batch request 465 of FIG. 4B. At block 1315, request add software 820 of FIG. 8 may receive a second request to add to batch request 465 of FIG. 4B. Finally, at block 1320, build software 805 of FIG. 8 may store batch request 465 of FIG. 4B.

Figure 14A:
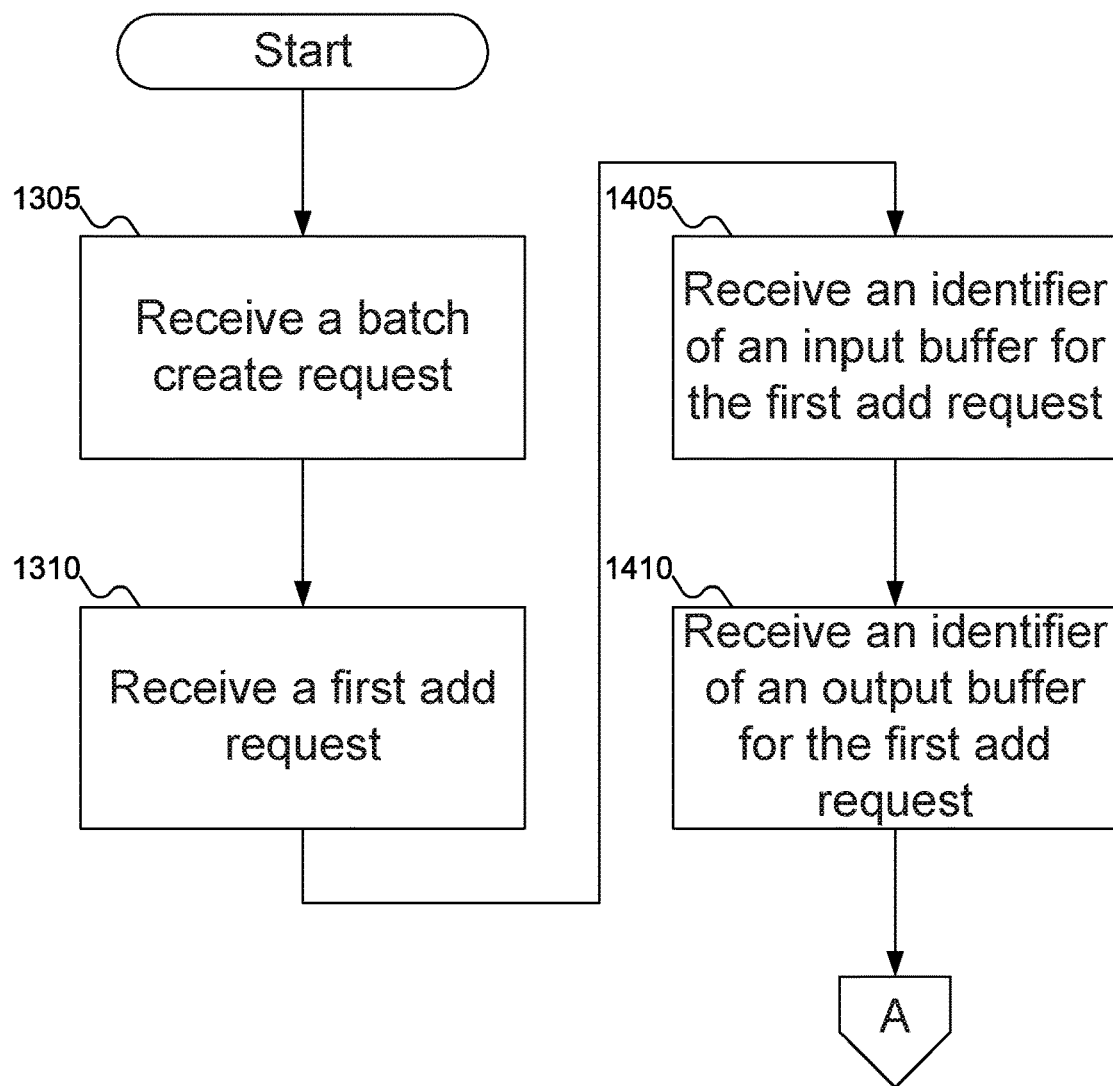
FIG. 14A shows a flowchart of another example procedure for using the software of FIG. 8 to build the batch request of FIG. 4B, according to embodiments of the disclosure.
Figure 14B:
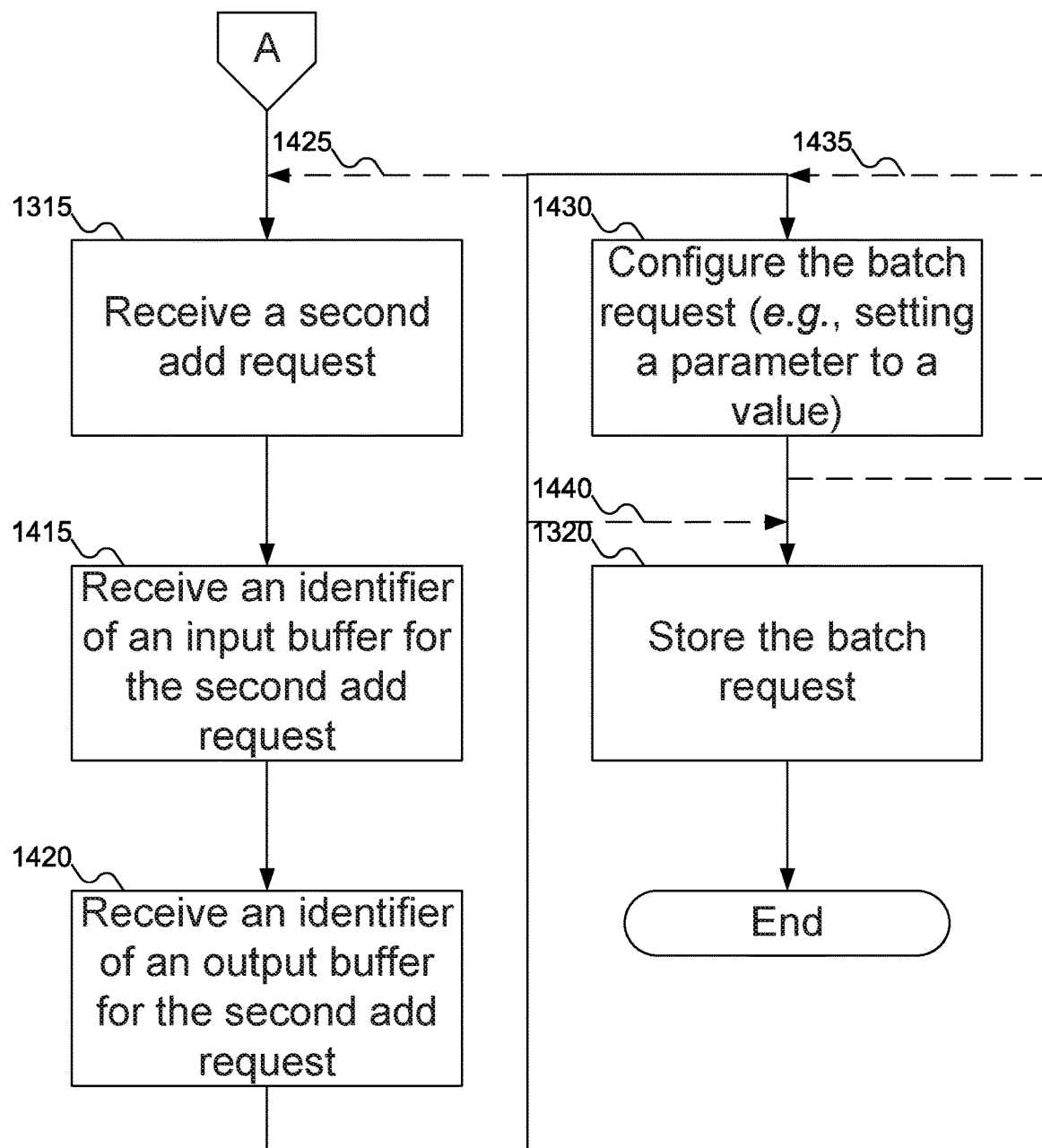
FIG. 14B continues the flowchart of FIG. 14A of another example procedure for using the software of FIG. 8 to build the batch request of FIG. 4B, according to embodiments of the disclosure.

FIGS. 14A-14B show a flowchart of an example procedure for using build software 805 of FIG. 8 to build batch request 465 of FIG. 4B, according to embodiments of the disclosure. FIGS. 14A-14B are similar to FIG. 13, but more general and with some additional blocks. In FIG. 14A, at block 1305, batch create software 815 of FIG. 8 may receive a request to create batch request 465 of FIG. 4B. At block 1310, request add software 820 of FIG. 8 may receive a request to add to batch request 465 of FIG. 4B. At block 1405, request add software 820 of FIG. 8 may receive an identifier of an input buffer 635-660 of FIG. 6 for the request to add to batch request 465 of FIG. 4B, and at block 1410 request add software 820 of FIG. 8 may receive an identifier of an output buffer 635-660 of FIG. 6 for the request to add to batch request 465 of FIG. 4B. Note that depending on the request, the request may omit input buffer 635-660, output buffer 635-660, or both.

At block 1315 (FIG. 14B), request add software 820 of FIG. 8 may receive a second request to add to batch request 465 of FIG. 4B. At block 1415, request add software 820 of FIG. 8 may receive an identifier of an input buffer 635-660 of FIG. 6 for the second request to add to batch request 465 of FIG. 4B, and at block 1420 request add software 820 of FIG. 8 may receive an identifier of an output buffer 635-660 of FIG. 6 for the second request to add to batch request 465 of FIG. 4B. Control may return to block 1315 if there are more requests to add to batch request 465 of FIG. 4B, as shown by dashed line 1425.

At block 1430, build software 805 of FIG. 8 may receive configuration information regarding one of the requests in batch request 465 of FIG. 4B. If more requests are to be configured, block 1430 may be repeated, as shown by dashed line 1435. Block 1435 may also be omitted as shown by dashed line 1440, if no request requires configuration. Finally, at block 1320, build software 805 of FIG. 8 may store batch request 465 of FIG. 4B.

Figure 15:
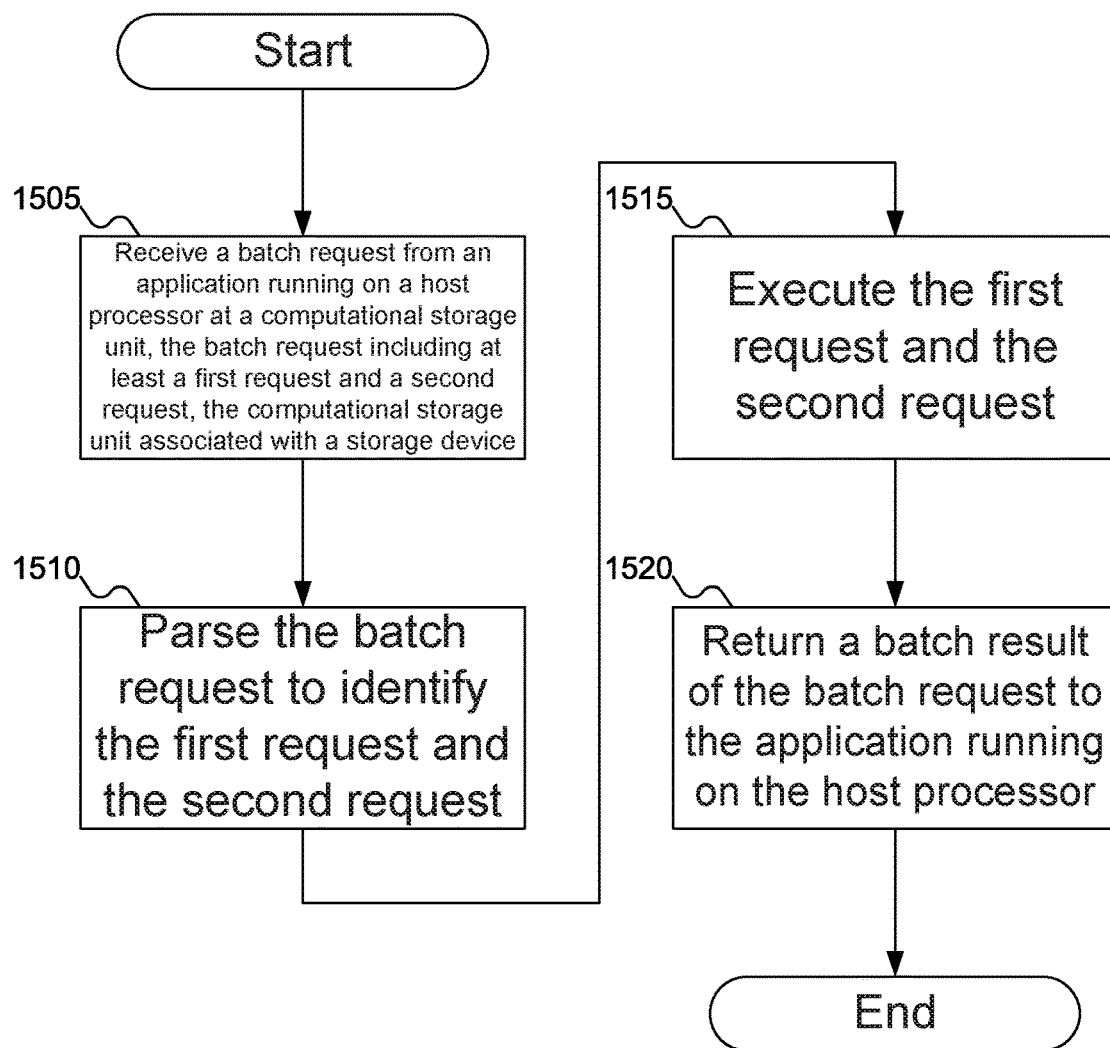
FIG. 15 shows a flowchart of an example procedure for the computational storage unit of FIG. 1 to process the batch request of FIG. 4B, according to embodiments of the disclosure.

FIG. 15 shows a flowchart of an example procedure for the computational storage unit of FIG. 1 to process the batch request of FIG. 4B, according to embodiments of the disclosure. In FIG. 15, at block 1505, receiver 1105 of FIG. 11 may receive batch request 465 of FIG. 4B. At block 1510, parser 1110 of FIG. 11 may parse batch request 465 of FIG. 4B to identify the individual requests in batch request 465 of FIG. 4B. At block 1515, hardware 1130 of FIG. 11 (or some other hardware in computational storage unit 135 of FIG. 1) may execute the first request, and hardware 1130 of FIG. 11 (or some other hardware in computational storage unit 135 of FIG. 1) may execute the second request. Finally, at block 1520, transmitter 1135 may send batch result 470 of FIG. 4B to application 405 of FIG. 4B, reporting the result of batch request 465 of FIG. 4B.

Figure 16A:
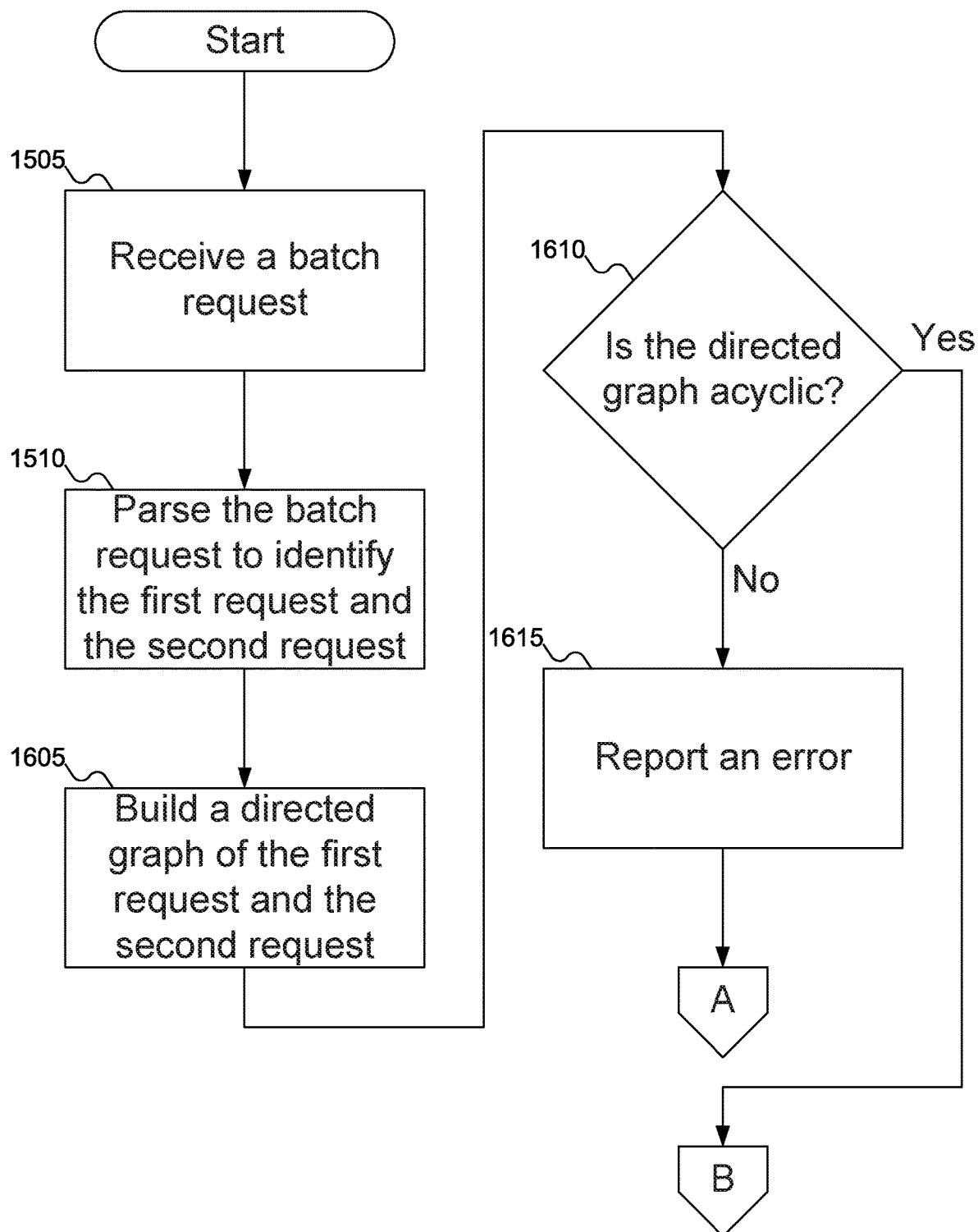
FIG. 16A shows a flowchart of another example procedure for the computational storage unit of FIG. 1 to process the batch request of FIG. 4B, according to embodiments of the disclosure.
Figure 16B:
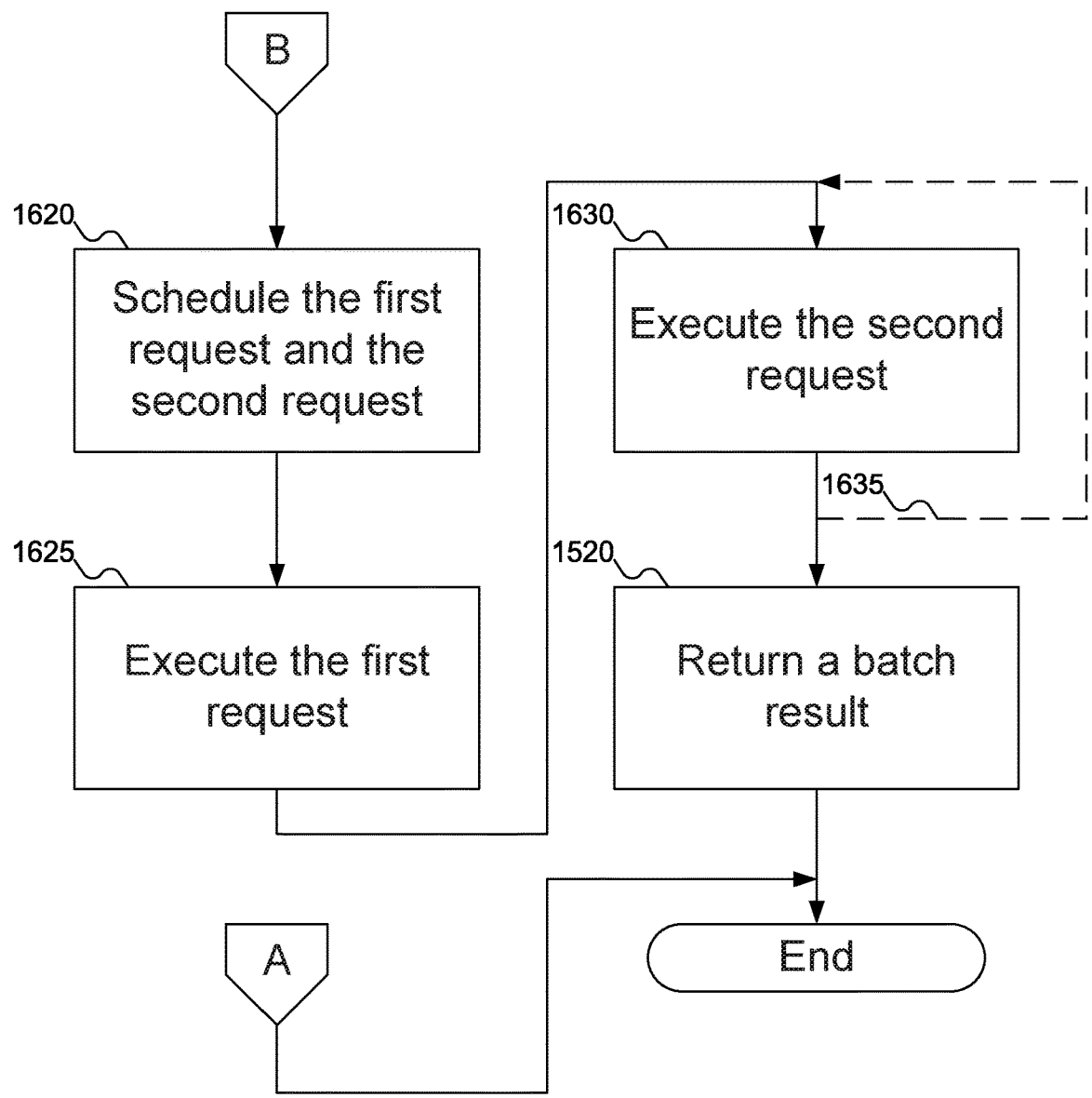
FIG. 16B continues the flowchart of another example procedure for the computational storage unit of FIG. 1 to process the batch request of FIG. 4B, according to embodiments of the disclosure.

FIGS. 16A-16B show a flowchart of an example procedure for computational storage unit 135 of FIG. 1 to process batch request 465 of FIG. 4B, according to embodiments of the disclosure. FIGS. 16A-16B are similar to FIG. 15, but more general and with some additional blocks. In FIG. 16A, at block 1505, receiver 1105 of FIG. 11 may receive batch request 465 of FIG. 4B. At block 1510, parser 1110 of FIG. 11 may parse batch request 465 of FIG. 4B to identify the individual requests in batch request 465 of FIG. 4B. At block 1605, directed graph constructor 1115 of FIG. 11 may construct directed graph 1205 of FIG. 12, representing the dependencies of the requests in batch request 465 of FIG. 4B.

At block 1610, verifier 1120 of FIG. 11 may verify whether directed graph 1205 of FIG. 12 is acyclic. If not, then at block 1615 computational storage unit 135 of FIG. 1 may report an error, since batch request 465 of FIG. 4B may not be satisfied. Otherwise, at block 1620 (FIG. 16B), scheduler 1125 may schedule the individual requests in batch request 465 of FIG. 4B (of which there are typically at least two). At block 1625, hardware 1130 of FIG. 11 may execute the first request, and at block 1630 hardware 1130 (or some other hardware in computational storage unit 135 of FIG. 1) may execute the second request. Block 1630 may be repeated if there are more requests in batch request 465 of FIG. 4B, as shown by dashed line 1635. Finally, at block 1520, transmitter 1135 may send batch result 470 of FIG. 4B to application 405 of FIG. 4B, reporting the result of batch request 465 of FIG. 4B.

Figure 17:
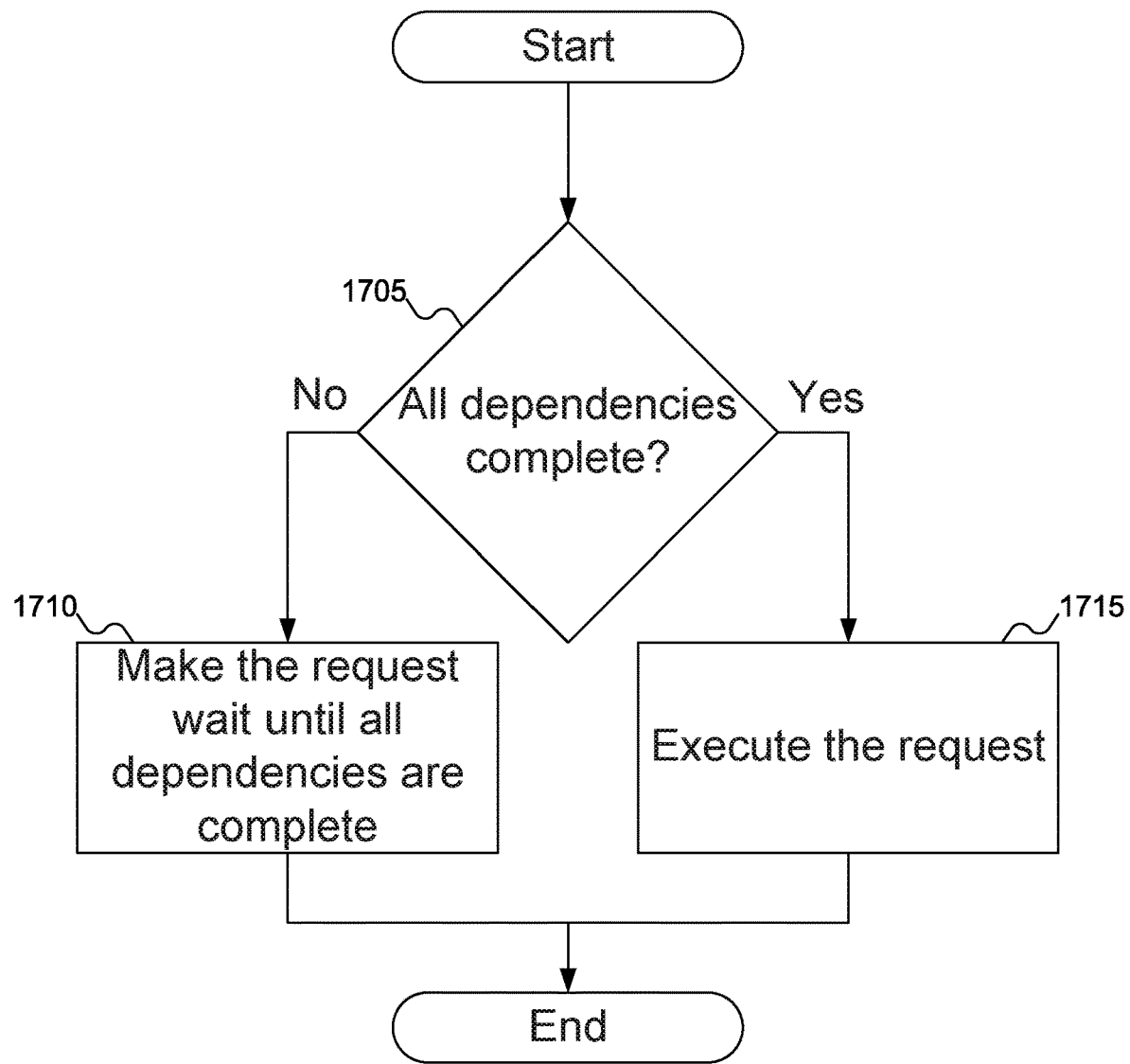
FIG. 17 shows a flowchart of an example procedure for the scheduler of FIG. 11 to schedule various requests in the batch request of FIG. 4B for execution, according to embodiments of the disclosure.
Figure 18:
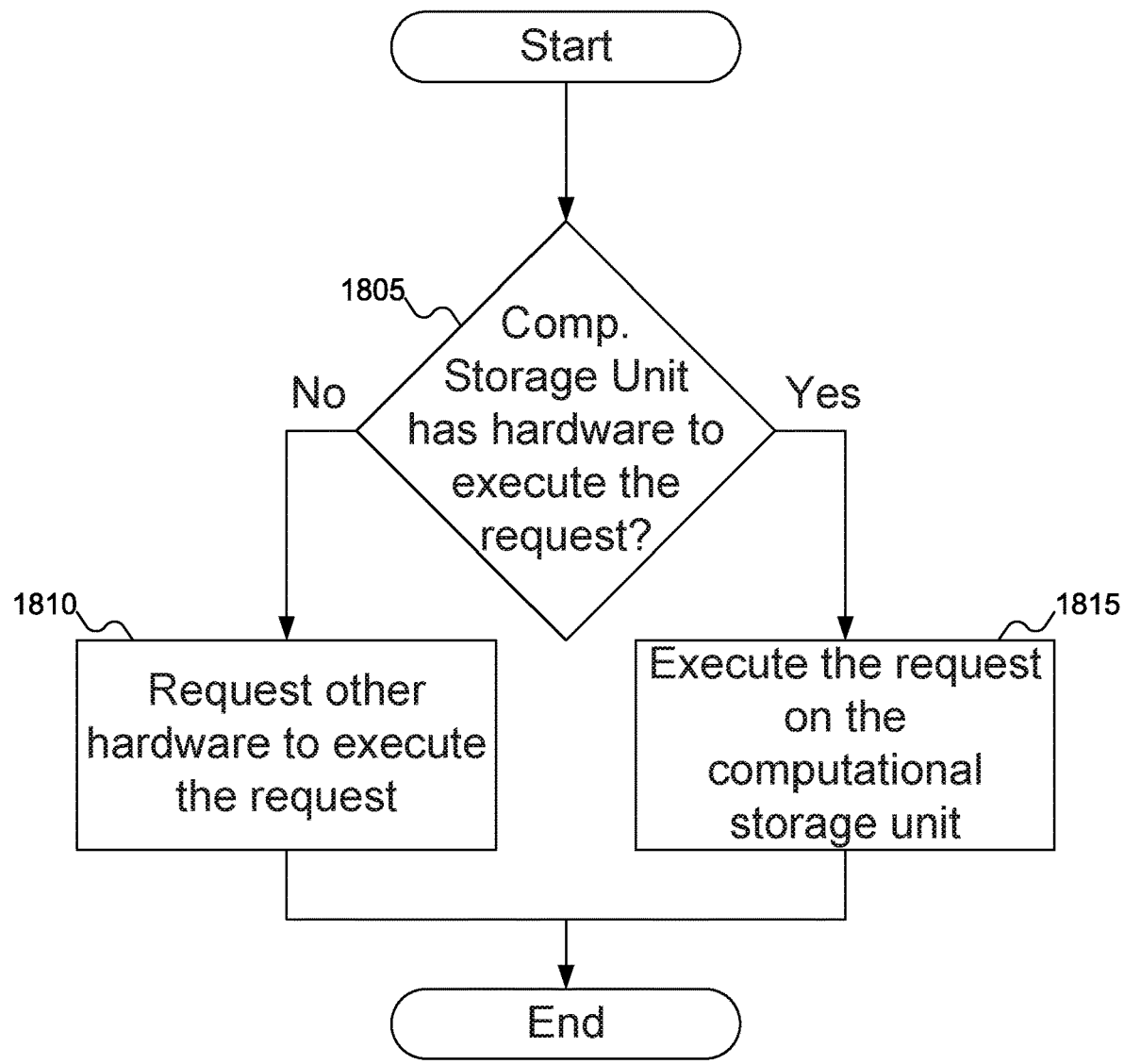
FIG. 18 shows a flowchart of another example procedure for the scheduler of FIG. 11 to schedule various requests in the batch request of FIG. 4B for execution, according to embodiments of the disclosure.

FIGS. 17-18 show flowcharts of example procedures for scheduler 1125 of FIG. 11 to schedule various requests in batch request 465 of FIG. 4B for execution, according to embodiments of the disclosure. In FIG. 17, at block 1705, scheduler 1125 of FIG. 11 may determine whether all the dependencies (assuming there are any) for an individual request have completed (that is, any requests that generate data used by the current request have completed their execution). If not, then at block 1710 scheduler 1125 of FIG. 11 may make that request wait until all the dependencies have completed. Otherwise, at block 1715, scheduler 1125 of FIG. 11 may schedule the request for execution.

In FIG. 18, at block 1805, scheduler 1125 of FIG. 11 may determine whether computational storage unit 135 of FIG. 1 includes the necessary hardware and/or software to execute a particular request in batch request 465 of FIG. 4B. If not, then at block 1810 scheduler 1125 of FIG. 11 may ask other hardware (such as processor 110 of FIG. 1 or another computational storage unit 135 of FIG. 1 of system 105 of FIG. 1) to execute the request. (Alternatively, scheduler 1125 of FIG. 11 might cause batch request 465 of FIG. 4B to fail due to lack of the appropriate hardware and/or software to execute the request.) Otherwise, at block 1815, scheduler 1125 of FIG. 11 may schedule the request for execution on computational storage unit 135 of FIG. 1.

In FIGS. 14A-18, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

Embodiments of the disclosure offer technical advantages over the prior art. By building a batch request and submitting the batch request to a computational storage unit rather than sending the individual requests separately, the amount of data sent as part of communicating the batch request with the computational storage unit may be reduced, leaving more bandwidth available for other purposes. In addition, batch requests may be reconfigured and/or reused, reducing the energy required to communicate multiple sets of requests that differ only slightly. Using batch requests, particularly through an Application Programming Interface (API) may also abstract the computational storage unit from the application using the batch request, thereby avoiding the need for the application to determine whether the computational storage unit has the hardware and/or software required to implement the batch request.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a system, comprising:
   a processor;
   software configured to run on the processor and to generate a batch request, the batch request including at least a first request and a second request;
   a storage device; and
   a computational storage unit associated with the storage device, the computational storage unit configured to process the batch request.

Statement 2. An embodiment of the disclosure includes the system according to statement 1, wherein the computational storage unit is configured to receive the batch request from an application running on the processor and to return a batch result of the batch request to the application based at least in part on the first request and the second request.

Statement 3. An embodiment of the disclosure includes the system according to statement 1, wherein the software includes a device driver.

Statement 4. An embodiment of the disclosure includes the system according to statement 1, wherein the software includes an application programming interface (API).

Statement 5. An embodiment of the disclosure includes the system according to statement 1, wherein the software includes request add software to add the first request to the batch request.

Statement 6. An embodiment of the disclosure includes the system according to statement 5, wherein the request add software is configured to add the first request to the batch request before the second request in the batch request.

Statement 7. An embodiment of the disclosure includes the system according to statement 5, wherein the request add software is configured to add the first request to the batch request after the second request in the batch request.

Statement 8. An embodiment of the disclosure includes the system according to statement 1, wherein the batch request includes one of a serial structure, a parallel structure, or a hybrid structure.

Statement 9. An embodiment of the disclosure includes the system according to statement 1, further comprising second software configured to send the batch request to the computational storage unit.

Statement 10. An embodiment of the disclosure includes the system according to statement 9, wherein the second software includes an API.

Statement 11. An embodiment of the disclosure includes the system according to statement 10, wherein the second software includes a device driver.

Statement 12. An embodiment of the disclosure includes the system according to statement 1, wherein the first request and the second request are included in the batch request based at least in part on the first request and the second request being related.

Statement 13. An embodiment of the disclosure includes the system according to statement 1, wherein the computational storage unit includes:
  a receiver to receive the batch request from an application running on the processor;
  a parser to parse the batch request into at least the first request and the second request;
  a directed graph constructor to construct a directed graph from at least the first request and the second request;
  a scheduler to schedule the first request and the second request for execution based at least in part on the directed graph; and
  hardware to execute at least the first request.

Statement 14. An embodiment of the disclosure includes a computational storage unit, comprising:
  a receiver to receive a batch request from an application running on a processor;
  a parser to parse the batch request into at least a first request and a second request;
  a directed graph constructor to construct a directed graph from at least the first request and the second request;
  a scheduler to schedule the first request and the second request for execution based at least in part on the directed graph;
  hardware to execute the first request based at least in part on the scheduler; and
  a transmitter to send a batch result of the batch request to the application running on the processor based at least in part on the first request and the second request.

Statement 15. An embodiment of the disclosure includes the computational storage unit according to statement 14, further comprising second hardware to execute the second request.

Statement 16. An embodiment of the disclosure includes the computational storage unit according to statement 15, wherein the second hardware is the hardware.

Statement 17. An embodiment of the disclosure includes the computational storage unit according to statement 14, wherein the hardware is drawn from a set including a central processing unit (CPU), a processor, a graphics processing unit (GPU), a general purpose GPU (GPGPU), a tensor processing unit (TPU), a data processing unit (DPU), a Berkeley Packet Filter (BPF) processor, a Field Programmable Gate Array (FPGA), or an Application-Specific Integrated Circuit (ASIC).

Statement 18. An embodiment of the disclosure includes the computational storage unit according to statement 14, further comprising a verifier to verify that the directed graph is acyclic.

Statement 19. An embodiment of the disclosure includes the computational storage unit according to statement 14, wherein the scheduler is configured to schedule the first request to execute based at least in part on the directed graph indicating that the first request is independent of the second request.

Statement 20. An embodiment of the disclosure includes the computational storage unit according to statement 19, wherein the scheduler is configured to schedule the second request to execute in parallel with the first request based at least in part on the directed graph indicating that the second request is independent of the first request and the hardware supports parallel processing of the first request and the second request.

Statement 21. An embodiment of the disclosure includes the computational storage unit according to statement 14, wherein the scheduler is configured to schedule the first request to execute based at least in part on a completion of the second request and the directed graph indicating that the first request depends on the second request.

Statement 22. An embodiment of the disclosure includes the computational storage unit according to statement 14, wherein the scheduler is configured to schedule the processor to execute the second request based at least in part on a configuration of the computational storage unit.

Statement 23. An embodiment of the disclosure includes a method, comprising:
  receiving a batch create request to create a batch request;
  receiving a first add request to add a first request to the batch request;
  receiving a second add request to add a second request to the batch request; and
  storing the batch request.

Statement 24. An embodiment of the disclosure includes the method according to statement 23, wherein receiving the second add request to add the second request to the batch request includes receiving the second add request to add the second request to the batch request in series with the first request.

Statement 25. An embodiment of the disclosure includes the method according to statement 24, wherein receiving the second add request to add the second request to the batch request in series with the first request includes receiving the second add request to add the second request to the batch request in series with the first request and after the first request.

Statement 26. An embodiment of the disclosure includes the method according to statement 24, wherein receiving the second add request to add the second request to the batch request in series with the first request includes receiving the second add request to add the second request to the batch request in series with the first request and before the first request.

Statement 27. An embodiment of the disclosure includes the method according to statement 23, wherein receiving the second add request to add the second request to the batch request includes receiving the second add request to add the second request to the batch request in parallel with the first request.

Statement 28. An embodiment of the disclosure includes the method according to statement 23, wherein receiving the first add request to add the first request to the batch request includes:
  receiving an identifier of an input buffer for the first request; and
  receiving an identifier of an output buffer for the first request.

Statement 29. An embodiment of the disclosure includes the method according to statement 23, further comprising configuring the batch request.

Statement 30. An embodiment of the disclosure includes the method according to statement 29, wherein configuring the batch request includes setting a parameter of the batch request to a value.

Statement 31. An embodiment of the disclosure includes the method according to statement 30, wherein setting the parameter of the batch request to the value includes setting the parameter of the first request to the value.

Statement 32. An embodiment of the disclosure includes the method according to statement 23, wherein the batch request is independent of a hardware of a storage device or a computational storage unit associated with the storage device.

Statement 33. An embodiment of the disclosure includes the method according to statement 23, wherein the batch request may be used for a first data and a second data.

Statement 34. An embodiment of the disclosure includes the method according to statement 23, wherein the first request and the second request are included in the batch request based at least in part on the first request and the second request being related.

Statement 35. An embodiment of the disclosure includes a method, comprising:
- receiving a batch request from an application running on a host processor at a computational storage unit, the batch request including at least a first request and a second request, the computational storage unit associated with a storage device;
- parsing the batch request to identify the first request and the second request;
- executing the first request and the second request; and
- returning a batch result of the batch request to the application running on the host processor.

Statement 36. An embodiment of the disclosure includes the method according to statement 35, wherein receiving the batch request from the application running on the host processor at the computational storage unit includes generating a directed graph for the batch request based at least in part on the first request and the second request.

Statement 37. An embodiment of the disclosure includes the method according to statement 36, wherein receiving the batch request from the application running on the host processor at the computational storage unit further includes verifying that the directed graph is acyclic.

Statement 38. An embodiment of the disclosure includes the method according to statement 37, wherein receiving the batch request from the application running on the host processor at the computational storage unit further includes reporting an error based at least in part on the directed graph being cyclic.

Statement 39. An embodiment of the disclosure includes the method according to statement 36, wherein executing the first request and the second request includes scheduling, by the computational storage unit, the first request and the second request based at least in part on the directed graph.

Statement 40. An embodiment of the disclosure includes the method according to statement 39, wherein scheduling, by the computational storage unit, the first request and the second request based at least in part on the directed graph includes scheduling, by the computational storage unit, the computational storage unit to execute the first request based at least in part on the directed graph indicating that the first request is independent of the second request.

Statement 41. An embodiment of the disclosure includes the method according to statement 40, wherein scheduling, by the computational storage unit, the first request and the second request based at least in part on the directed graph includes scheduling, by the computational storage unit, the computational storage unit to execute the second request in parallel with the first request based at least in part on the directed graph indicating that the second request is independent of the first request and the computational storage unit supporting parallel processing.

Statement 42. An embodiment of the disclosure includes the method according to statement 39, wherein scheduling, by the computational storage unit, the first request and the second request based at least in part on the directed graph includes scheduling, by the computational storage unit, the first request to execute based at least in part on a completion of the second request and the directed graph indicating that the first request depends on the second request.

Statement 43. An embodiment of the disclosure includes the method according to statement 39, wherein scheduling, by the computational storage unit, the first request and the second request based at least in part on the directed graph includes scheduling, by the computational storage unit, for the host processor to execute the first request based at least in part on the computational storage unit not supporting the first request.

Statement 44. An embodiment of the disclosure includes the method according to statement 35, wherein executing the first request and the second request includes executing the first request and the second request on the computational storage unit.

Statement 45. An embodiment of the disclosure includes the method according to statement 35, wherein returning the batch result of the batch request to the application running on the host processor includes returning the batch result of the batch request to the application running on the host processor based at least in part on the first request and the second request.

Statement 46. An embodiment of the disclosure includes an article, comprising a non-transitory storage medium, the non-transitory storage medium having stored thereon instructions that, when executed by a machine, result in:
- receiving a batch create request to create a batch request;
- receiving a first add request to add a first request to the batch request;
- receiving a second add request to add a second request to the batch request; and
- storing the batch request.

Statement 47. An embodiment of the disclosure includes the article according to statement 46, wherein receiving the second add request to add the second request to the batch request includes receiving the second add request to add the second request to the batch request in series with the first request.

Statement 48. An embodiment of the disclosure includes the article according to statement 47, wherein receiving the second add request to add the second request to the batch request in series with the first request includes receiving the second add request to add the second request to the batch request in series with the first request and after the first request.

Statement 49. An embodiment of the disclosure includes the article according to statement 47, wherein receiving the second add request to add the second request to the batch request in series with the first request includes receiving the second add request to add the second request to the batch request in series with the first request and before the first request.

Statement 50. An embodiment of the disclosure includes the article according to statement 46, wherein receiving the second add request to add the second request to the batch request includes receiving the second add request to add the second request to the batch request in parallel with the first request.

Statement 51. An embodiment of the disclosure includes the article according to statement 46, wherein receiving the first add request to add the first request to the batch request includes:
  receiving an identifier of an input buffer for the first request; and
  receiving an identifier of an output buffer for the first request.

Statement 52. An embodiment of the disclosure includes the article according to statement 46, the non-transitory storage medium having stored thereon further instructions that, when executed by the machine, result in configuring the batch request.

Statement 53. An embodiment of the disclosure includes the article according to statement 52, wherein configuring the batch request includes setting a parameter of the batch request to a value.

Statement 54. An embodiment of the disclosure includes the article according to statement 53, wherein setting the parameter of the batch request to the value includes setting the parameter of the first request to the value.

Statement 55. An embodiment of the disclosure includes the article according to statement 46, wherein the batch request is independent of a hardware of a storage device or a computational storage unit associated with the storage device.

Statement 56. An embodiment of the disclosure includes the article according to statement 46, wherein the batch request may be used for a first data and a second data.

Statement 57. An embodiment of the disclosure includes the article according to statement 46, wherein the first request and the second request are included in the batch request based at least in part on the first request and the second request being related.

Statement 58. An embodiment of the disclosure includes an article, comprising a non-transitory storage medium, the non-transitory storage medium having stored thereon instructions that, when executed by a machine, result in:
  receiving a batch request from an application running on a host processor at a computational storage unit, the batch request including at least a first request and a second request, the computational storage unit associated with a storage device;
  parsing the batch request to identify the first request and the second request;
  executing the first request and the second request; and
  returning a batch result of the batch request to the application running on the host processor.

Statement 59. An embodiment of the disclosure includes the article according to statement 58, wherein receiving the batch request from the application running on the host processor at the computational storage unit includes generating a directed graph for the batch request based at least in part on the first request and the second request.

Statement 60. An embodiment of the disclosure includes the article according to statement 59, wherein receiving the batch request from the application running on the host processor at the computational storage unit further includes verifying that the directed graph is acyclic.

Statement 61. An embodiment of the disclosure includes the article according to statement 60, wherein receiving the batch request from the application running on the host processor at the computational storage unit further includes reporting an error based at least in part on the directed graph being cyclic.

Statement 62. An embodiment of the disclosure includes the article according to statement 59, wherein executing the first request and the second request includes scheduling, by the computational storage unit, the first request and the second request based at least in part on the directed graph.

Statement 63. An embodiment of the disclosure includes the article according to statement 62, wherein scheduling, by the computational storage unit, the first request and the second request based at least in part on the directed graph includes scheduling, by the computational storage unit, the computational storage unit to execute the first request based at least in part on the directed graph indicating that the first request is independent of the second request.

Statement 64. An embodiment of the disclosure includes the article according to statement 63, wherein scheduling, by the computational storage unit, the first request and the second request based at least in part on the directed graph includes scheduling, by the computational storage unit, the computational storage unit to execute the second request in parallel with the first request based at least in part on the directed graph indicating that the second request is independent of the first request and the computational storage unit supporting parallel processing.

Statement 65. An embodiment of the disclosure includes the article according to statement 62, wherein scheduling, by the computational storage unit, the first request and the second request based at least in part on the directed graph includes scheduling, by the computational storage unit, the first request to execute based at least in part on a completion of the second request and the directed graph indicating that the first request depends on the second request.

Statement 66. An embodiment of the disclosure includes the article according to statement 62, wherein scheduling, by the computational storage unit, the first request and the second request based at least in part on the directed graph includes scheduling, by the computational storage unit, for the host processor to execute the first request based at least in part on the computational storage unit not supporting the first request.

Statement 67. An embodiment of the disclosure includes the article according to statement 58, wherein executing the first request and the second request includes executing the first request and the second request on the computational storage unit.

Statement 68. An embodiment of the disclosure includes the article according to statement 58, wherein returning the batch result of the batch request to the application running on the host processor includes returning the batch result of the batch request to the application running on the host processor based at least in part on the first request and the second request.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:
1. A system, comprising:
  a chassis;
  a processor in the chassis;

software configured to run on the processor and to build a batch request for an application, the batch request including at least a first request and a second request;
a storage device in the chassis; and
a computational storage unit in the chassis associated with the storage device, the computational storage unit configured to process the batch request using data stored on the storage device received from the application.

2. The system according to claim 1, wherein the computational storage unit is configured to receive the batch request from the application running on the processor and to return a batch result of the batch request to the application based at least in part on the first request and the second request.

3. The system according to claim 1, wherein the software includes request add software to add the first request to the batch request.

4. The system according to claim 1, wherein the batch request includes one of a serial structure, a parallel structure, or a hybrid structure.

5. The system according to claim 1, wherein:
the software includes a first software; and
the system further comprises second software configured to send the batch request to the computational storage unit.

6. The system according to claim 1, wherein the first request and the second request are included in the batch request based at least in part on the first request and the second request being related.

7. The system according to claim 1, wherein the computational storage unit includes:
a receiver to receive the batch request from the application running on the processor;
a parser to parse the batch request into at least the first request and the second request;
a graph constructor to construct a directed graph from at least the first request and the second request;
a scheduler to schedule the first request and the second request for execution based at least in part on the directed graph; and
hardware to execute at least the first request.

8. A computational storage unit, comprising:
a receiver to receive a batch request from an application running on a processor in a chassis;
a parser to parse the batch request into at least a first request and a second request;
a graph constructor to construct a directed graph from at least the first request and the second request;
a scheduler to schedule the first request and the second request for execution based at least in part on the directed graph;
hardware to execute the first request based at least in part on the scheduler; and
a transmitter to send a batch result of the batch request to the application running on the processor based at least in part on the first request and the second request,
wherein the computational storage unit is in the chassis.

9. The computational storage unit according to claim 8, further comprising second hardware to execute the second request.

10. The computational storage unit according to claim 8, further comprising a verifier to verify that the directed graph is acyclic.

11. The computational storage unit according to claim 8, wherein the scheduler is configured to schedule the first request to execute based at least in part on the directed graph indicating that the first request is independent of the second request.

12. The computational storage unit according to claim 8, wherein the scheduler is configured to schedule the first request to execute based at least in part on a completion of the second request and the directed graph indicating that the first request depends on the second request.

13. A method, comprising:
receiving, at a software, a batch create request from an application to create a batch request;
receiving, at the software, a first add request from the application to add a first request to the batch request;
receiving, at the software, a second add request from the application to add a second request to the batch request; and
storing, by the software, the batch request,
wherein the software is separate from the application.

14. The method according to claim 13, wherein receiving, at the software, the second add request from the application to add the second request to the batch request includes receiving, at the software, the second add request from the application to add the second request to the batch request in series with the first request.

15. The method according to claim 13, wherein receiving, at the software, the second add request from the application to add the second request to the batch request includes receiving, at the software, the second add request from the application to add the second request to the batch request in parallel with the first request.

16. The method according to claim 13, wherein receiving, at the software, the first add request from the application to add the first request to the batch request includes:
receiving, at the software, from the application, an identifier of an input buffer for the first request; and
receiving, at the software, from the application, an identifier of an output buffer for the first request.

17. The method according to claim 13, further comprising configuring, by the software, the batch request.

18. The method according to claim 17, wherein configuring, by the software, the batch request includes setting, by the software, a parameter of the batch request to a value.

19. The method according to claim 13, wherein the batch request is independent of a hardware of a storage device or a computational storage unit associated with the storage device.

20. The method according to claim 13, wherein a computational storage unit is configured to execute the batch request on behalf of the application on a first data and to execute the batch request on behalf of a second application on a second data.

21. The method according to claim 13, wherein:
the first request is to process a first data into a second data; and
the second request is to process the second data into a third data.

* * * * *